US010921620B2

(12) United States Patent
Sugamata et al.

(10) Patent No.: US 10,921,620 B2
(45) Date of Patent: Feb. 16, 2021

(54) OPTICAL MODULATOR AND OPTICAL TRANSMISSION APPARATUS

(71) Applicant: Sumitomo Osaka Cement Co., Ltd, Tokyo (JP)

(72) Inventors: Toru Sugamata, Tokyo (JP); Norikazu Miyazaki, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 466 days.

(21) Appl. No.: 15/719,730

(22) Filed: Sep. 29, 2017

(65) Prior Publication Data

US 2018/0088361 A1 Mar. 29, 2018

(30) Foreign Application Priority Data

Sep. 29, 2016 (JP) ................................. 2016-191695

(51) Int. Cl.
| | |
|---|---|
| G02B 26/00 | (2006.01) |
| G02F 1/01 | (2006.01) |
| G02F 1/03 | (2006.01) |
| G02F 1/035 | (2006.01) |
| G02B 6/26 | (2006.01) |
| H01S 3/10 | (2006.01) |
| H01S 3/13 | (2006.01) |

(52) U.S. Cl.
CPC .......... *G02F 1/0316* (2013.01); *G02F 1/0327* (2013.01); *G02F 2203/50* (2013.01)

(58) Field of Classification Search
CPC ........ G02B 26/001; G02B 6/126; G02B 6/43; B82Y 20/00; H04B 10/505; H01S 5/026; H01S 3/107; H01S 5/0683; H01S 5/0425; G02F 1/015; G02F 2203/50; G02F 1/0316; G02F 1/2215; G02F 1/225; G02F 1/335; G02F 1/3132
USPC ....... 359/238, 237, 240, 245, 248, 276, 279, 359/254; 385/2, 3, 7, 11, 14, 40; 398/182, 183, 185, 187, 200; 372/26, 29, 372/13, 29.013
See application file for complete search history.

(56) References Cited

U.S. PATENT DOCUMENTS

| | | | |
|---|---|---|---|
| 9,651,804 B2 | 5/2017 | Sugiyama et al. | |
| 2003/0151792 A1 | 8/2003 | Kaitoh et al. | |
| 2011/0157673 A1* | 6/2011 | Mitomi ................ | G02F 1/2255 359/279 |
| 2011/0268382 A1 | 11/2011 | Takemura et al. | |

(Continued)

FOREIGN PATENT DOCUMENTS

| | | |
|---|---|---|
| JP | 2003-233043 A | 8/2003 |
| JP | 2004-317556 A | 11/2004 |

(Continued)

*Primary Examiner* — Dawayne Pinkney
(74) *Attorney, Agent, or Firm* — IpHorgan Ltd.

(57) ABSTRACT

An optical modulator includes an optical modulation element (102) including a plurality of signal electrodes (112a and the like), a plurality of lead pins (116a and the like) for inputting high frequency signals, and a relay substrate (118) in which conductor patterns (202a and the like) that electrically connect the lead pins and the signal electrodes are formed, and at least one of the conductor patterns in the optical modulator is constituted so that at least one resonant frequency of the at least one of the conductor patterns is different from at least one resonant frequency of at least one of the other conductor patterns.

12 Claims, 13 Drawing Sheets

(56) References Cited

U.S. PATENT DOCUMENTS

2012/0051683 A1 3/2012 Sugiyama
2017/0212402 A1 7/2017 Ishii et al.

FOREIGN PATENT DOCUMENTS

| JP | 2011-209456 A | 10/2011 |
| JP | WO 2010/021193 A1 | 1/2012 |
| JP | 2012-048121 A | 3/2012 |
| JP | 2014-199370 A | 10/2014 |
| JP | 2016109941 A | 6/2016 |
| JP | 2017-134131 A | 8/2017 |

* cited by examiner

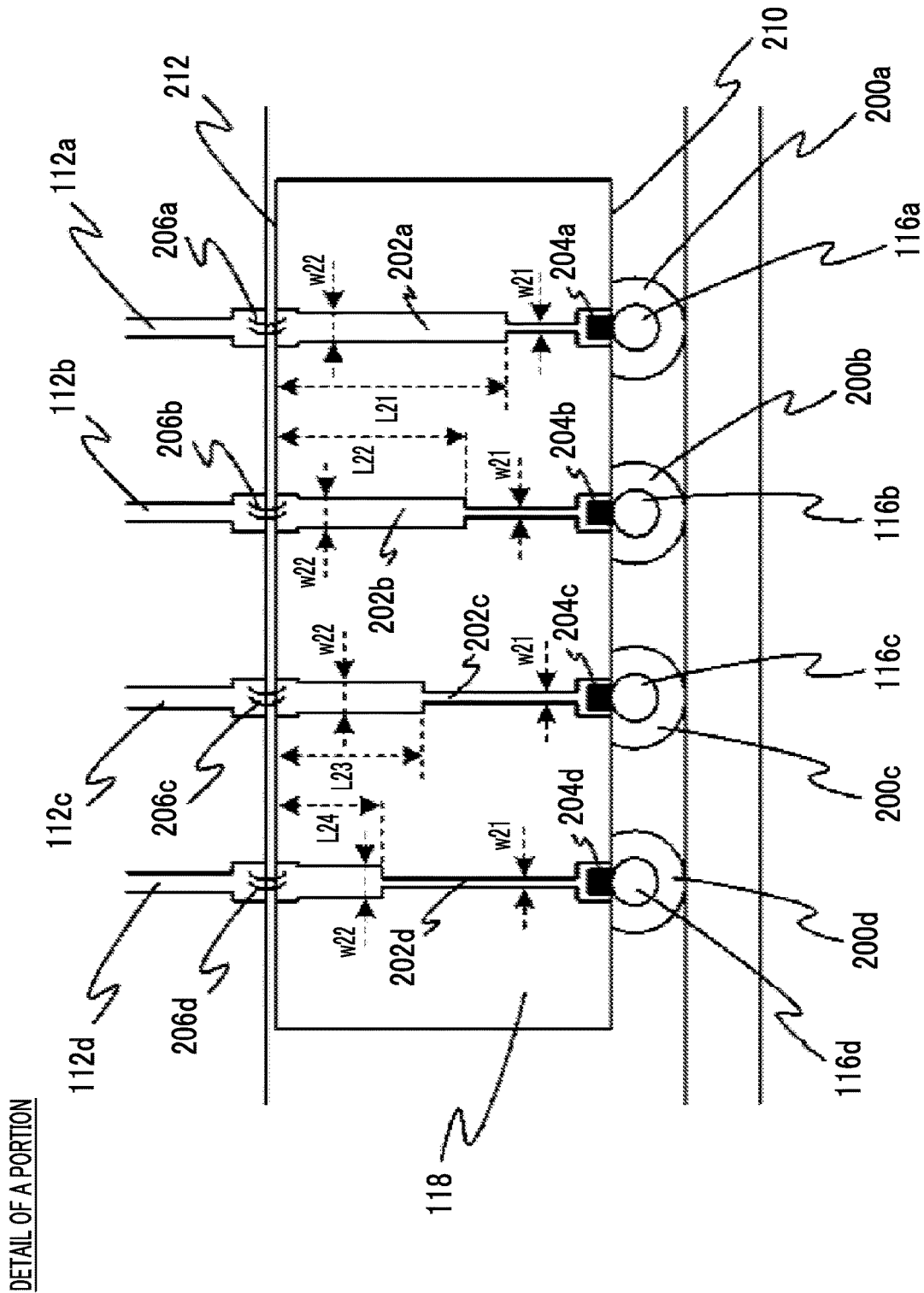

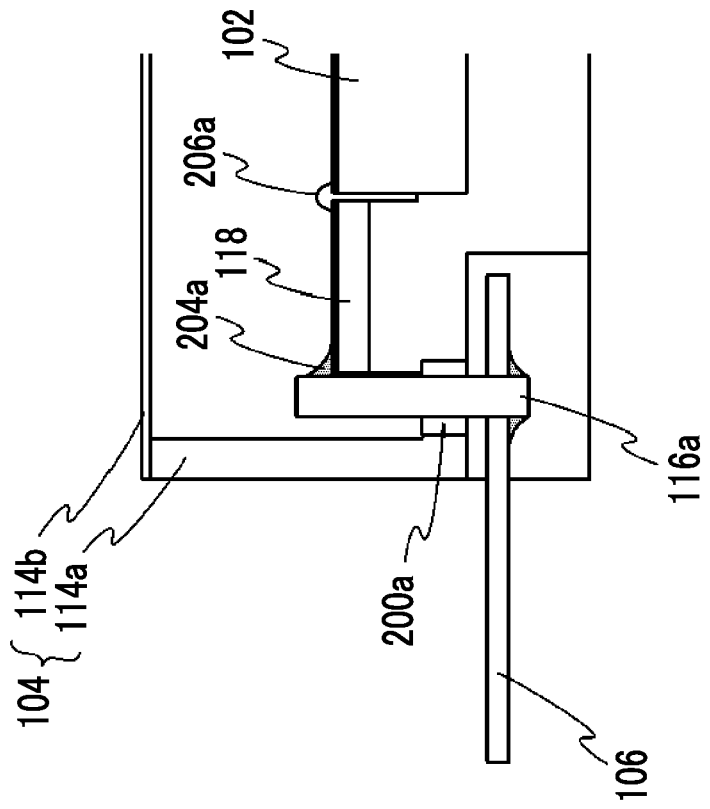

DETAIL OF D PORTION

DETAIL OF F PORTION

CROSS-SECTIONAL VIEW IN DIRECTION OF VIIG-VIIG LINE

OPTICAL MODULATOR AND OPTICAL TRANSMISSION APPARATUS

CROSS-REFERENCE TO RELATED APPLICATIONS

This application claims the benefit of Japanese Patent Application No. 2016-191695 filed Sep. 29, 2016, the disclosure of which is herein incorporated by reference in its entirety.

BACKGROUND OF THE INVENTION

Field of the Invention

The present invention relates to an optical modulator and particularly to an optical modulator including a relay substrate that relays a conductor (for example, a lead pin) for inputting high frequency signals, which is provided in a package case, and an electrode of an optical modulation element and an optical transmission apparatus using the optical modulator.

Description of Related Art

In high-frequency/high-capacity optical fiber communication systems, optical modulators embedded with waveguide-type optical modulation elements are frequently used. Among these, optical modulation elements in which LiNbO3 (hereinafter, also referred to as LN) having an electro-optic effect is used for substrates cause only a small light loss and are capable of realizing broad optical modulation characteristics and are thus widely used for high-frequency/high-capacity optical fiber communication systems.

In an optical modulation element in which this LN substrate is used, Mach-Zehnder-type optical waveguides, RF electrodes for applying high frequency signals, which are modulation signals, to the optical waveguides, and bias electrodes for performing a variety of adjustments for favorably maintaining modulation characteristics in the waveguides are provided. In addition, these electrodes provided on the optical modulation element are connected to a circuit substrate on which electronic circuits for causing modulation operations in the optical modulator are mounted via lead pins or connectors provided in a package case of the optical modulator which houses the optical modulation element.

Regarding modulation methods in optical fiber communication systems, in response to the recent trend of an increase in transmission capacity, transmission formats of multilevel modulation and transmission formats achieved by incorporating polarization multiplexing into multilevel modulation such as Quadrature Phase Shift Keying (QPSK) or Dual Polarization-Quadrature Phase Shift Keying (DP-QPSK) has become mainstream and been used in core optical transmission networks and also has been introduced into metro networks.

Optical modulators performing QPSK modulation (QPSK optical modulators) or optical modulators performing DP-QPSK modulation (DP-QPSK optical modulators) include a plurality of Mach-Zehnder-type optical waveguides having a nested structure, which is termed a so-called nest-type structure, and include a plurality of high frequency signal electrodes and a plurality of bias electrodes (for example, refer to Japanese Laid-open Patent Publication No. 2016-109941), which creates a tendency of an increase in the sizes of package cases of the optical modulators. However, in recent years, conversely, a demand for the size reduction of the modulators has been intensifying.

As a measure for satisfying the above-described demand for size reduction, an optical modulator which can be electrically connected to external circuit substrates by replacing a push-on-type coaxial connector provided in the package case of an optical modulator of the related art as an interface of the RF electrode by the same lead pins as the interfaces for the bias electrode and a flexible printed circuit (FPC) which is electrically connected to these lead pins is proposed (for example, refer to Japanese Laid-open Patent Publication No. 2016-109941).

For example, in a DP-QPSK optical modulator, an optical modulation element constituted of four Mach-Zehnder-type optical waveguides respectively having RF electrodes is used. In this case, four push-on-type coaxial connectors provided in the package case of the optical modulator inevitably increase the size of the package case, but the use of the lead pins and FPCs instead of the coaxial connectors enables size reduction.

In addition, since the lead pins in the package case of the optical modulator and a circuit substrate on which electronic circuits (driving circuits) for causing modulation operations in the optical modulator are mounted are connected to each other via the FPC, it is not necessary to perform the excess length treatment of coaxial cables used in the related art, and it is possible to decrease the installation space of the optical modulator in optical transmission apparatus.

In the above-described optical modulator including the lead pins for inputting high frequency electrical signals in the package case, generally, the lead pins and the electrodes of the optical modulation element housed in the package case are connected to each other via a relay substrate disposed in the package case (for example, refer to PTL 1).

FIG. 13A, FIG. 13B, and FIG. 13C are views illustrating an example of the constitution of the above-described optical modulator of the related art. Here, FIG. 13A is a plan view illustrating an optical modulator 1300 of the related art mounted on a circuit substrate 1330, FIG. 13B is a side view of the optical modulator 1300 of the related art, and FIG. 13C is a bottom view of the optical modulator 1300 of the related art. The present optical modulator 1300 includes an optical modulation element 1302, a package case 1304 housing the optical modulation element 1302, a flexible printed circuit (FPC) 1306, an optical fiber 1308 for making light incident on the optical modulation element 1302, and an optical fiber 1310 guiding light output from the optical modulation element 1302 to the outside of the package case 1304.

The optical modulation element 1302 is, for example, a DP-QPSK optical modulator including four Mach-Zehnder-type optical waveguides provided on an LN substrate and four high frequency electrodes (RF electrodes) 1312a, 1312b, 1312c, and 1312d which are respectively provided on the Mach-Zehnder-type optical waveguides and modulate light waves propagating through the optical waveguides.

The package case 1304 is constituted of a case 1314a to which the optical modulation element 1302 is fixed and a cover 1314b. Meanwhile, in order to facilitate the understanding of the constitution in the package case 1304, in FIG. 13A, the cover 1314b is only partially illustrated in the left side of the drawing.

The case 1304a is provided with four lead pins 1316a, 1316b, 1316c, and 1316d. These lead pins 1316a, 1316b, 1316c, and 1316d are sealed with glass sealing portions 1400a, 1400b, 1400c, and 1400d (described below), extend outwards from the bottom surface (the surface illustrated in FIG. 13C) of the package case 1304, and are connected to through-holes, formed on the FPC 1306 with solders, and the like.

One end of each of the lead pins 1316a, 1316b, 1316c, and 1316d is electrically connected to each of the RF electrodes 1312a, 1312b, 1312c, and 1312d of the optical modulation element 1302 via the relay substrate 1318.

The other end of each of the RF electrodes 1312a, 1312b, 1312c, and 1312d is electrically terminated to one another using a terminator 1320.

FIG. 14A is a partial detail view of an F portion of the optical modulator 1300 illustrated in FIG. 13A, and FIG. 14B is a cross-sectional view of the optical modulator 1300 in a direction of a VIIG-VIIG line in FIG. 13A. The lead pins 1316a, 1316b, 1316c, and 1316d respectively extend toward the outside of the package case 1304 from the inside of the package case 1304 via the glass sealing portions 1400a, 1400b, 1400c, and 1400d provided in the case 1314a, protrude from the bottom surface (the surface illustrated in FIG. 13C) of the package case 1304, and are solder-fixed to the through-holes in the FPC 1306.

The lead pins 1316a, 1316b, 1316c, and 1316d are disposed in the vicinity of a side (lead pin-side edge 1410) of the relay substrate 1318 on the lower side of FIG. 14A (the left side of the relay substrate 1318 in FIG. 14B), and are electrically connected to conductor patterns 1402a, 1402b, 1402c, and 1402d provided on the relay substrate 1318 with solders 1404a, 1404b, 1404c, and 1404d respectively.

In addition, the conductor patterns 1402a, 1402b, 1402c, and 1402d are electrically connected to the RF electrodes 1312a, 1312b, 1312c, and 1312d in the lower end portion in the drawing of the optical modulation element 1302 (the left end of the optical modulation element 1302 in FIG. 14B), which are disposed in the vicinity of a side (modulator-side edge 1412) of the relay substrate 1318 on the upper side of FIG. 14A (the right side of the relay substrate 1318 in FIG. 14B) by, for example, metal wires 1406a, 1406b, 1406c, and 1406d respectively.

The conductor patterns 1402a, 1402b, 1402c, and 1402d formed on the relay substrate 1318 are generally constituted as linear patterns that are parallel to each other in order to minimize the signal propagation loss and the skew (propagation delay time difference) by minimizing the propagation distance of high frequency signals from the respective lead pins 1316a, 1316b, 1316c, and 1316d to the respective RF electrodes 1312a, 1312b, 1312c, and 1312d corresponding to the lead pins 1316a, 1316b, 1316c, and 1316d. Therefore, the optical modulator 1300 is constituted so that the intervals among the respective lead pins 1316a, 1316b, 1316c, and 1316d and the intervals among the respective RF electrodes 1312a, 1312b, 1312c, and 1312d are the same as each other.

In addition, generally, electrical signals that are input from the lead pins 1316a and the like sealed with the glass sealing portions 1400a and the like are high frequency signals (microwave signals) of several tens of gigahertz. Therefore, when the designed impedance of the lead pins 1316a and the like, the designed impedance of the conductor patterns 1402a and the like formed on the relay substrate 1318, and the designed impedance of the RF electrodes 1312a and the like of the optical modulation element 1302 are set to, for example, values that are the same as each other (for example, 50Ω), impedance matching is achieved. Therefore, the reflection of high frequency signals in high frequency transmission channels from the lead pins 1316a and the like to the RF electrode 1312a and the like of the optical modulation element 1302 via the conductor patterns 1402a and the like on the relay substrate 1318 is suppressed.

Due to the above-described constitution, in the optical modulator 1300, high frequency electrical signals input to the lead pins 1316a, 1316b, 1316c, and 1316d from the conductor patterns 1332a, 1332b, 1332c, and 1332d formed on the circuit substrate 1330 (FIG. 1A) through the FPC 1306 are input to the RF electrodes 1312a, 1312b, 1312c, and 1312d of the optical modulation element 1302 via the relay substrate 1318.

However, even in the optical modulator 1300 in which impedance matching is achieved as described above, there are cases in which problems of the superimposition of noise signal components in the respective RF electrodes 1312a and the like of the optical modulation element 1302, the deterioration of the high frequency characteristics such as eye pattern extinction ratio or jitter of the optical modulator 1300, and the deterioration of the transmission characteristics of optical transmission apparatus are caused.

As a result of intensive studies regarding these problems, the inventors of the present invention found that one cause of the problems is a phenomenon in which high frequencies that have propagated through one conductor pattern (1402a or the like) are repeatedly reflected at both end portions of the relay substrate and thus resonate, and the high frequencies that have resonated resonate with the other conductor pattern (1402b or the like), whereby some of the power of the high frequencies transits to the second conductor pattern (hereinafter, referred to as resonance transition).

That is, the connection portion with the lead pins 1316a and the like at one end portion of the relay substrate 1318 is a portion in which the propagation direction of high frequencies that have propagated through the lead pins 1316a and the like curves at 90 degrees toward the conductor patterns 1402a and the like on the relay substrate 1318 (FIG. 14B), and, even when the designed impedances are matched between the lead pins 1316a and the like and the conductor patterns 1402a and the like, it may not be possible to sufficiently suppress the reflection of high frequencies in the above-described one end portion.

In addition, in the connection portion with the RF electrodes 1312a and the like of the optical modulation element 1302 at the other end portion of the relay substrate 1318 as well, since the patterns (the conductor patterns 1402a and the like and the RF electrodes 1312a and the like) that are respectively formed on two substrates having mutually different dielectric constants that are the relay substrate 1318 (for example, ceramic) and the substrate (for example, lithium niobate) of the optical modulation element 1302 are connected to each other by, for example, a wire with a space inserted therebetween, even when the designed impedances of these patterns are set to be the same as each other, it is difficult to completely suppress the reflection of high frequencies at the other end portion.

As a result, due to the reflection of high frequencies occurring at both end portions of the relay substrate 1318, high frequencies propagating through the conductor patterns 1402a and the like have the maximum power at the intrinsic resonant frequencies determined by the electrical lengths of the conductor patterns 1402a and the like which are distributed constant lines. In addition, the resonant frequency component having the maximum power returns to electrical signal sources as reflected waves and unstablizes the operation of external circuits (for example, a drive circuit that outputs high frequency electrical signals for the respective RF electrodes 1312a and the like) or reaches the RF electrodes 1312a and the like as travelling waves (or transmitted waves) and turns into noise.

Particularly, in the relay substrate 1318 in the optical modulator 1300 of the related art, as described above, the conductor patterns 1402a, 1402b, 1402c, and 1402d are constituted as linear patterns that are parallel to each other in order to minimize the signal propagation loss and the skew, and thus the resonance frequencies in the respective conductor patterns are substantially the same. As a result, when resonance occurs in one conductor pattern, the high frequency component having the resonant frequency at which the high frequency component has the maximum power is received by other conductor patterns, and the resonance transition occurs.

In addition, in a case in which the above-described resonance transition occurs, a resonant frequency component having a high powder which is generated in one conductor pattern does not only affect the operation of the corresponding RF electrode, but also affects the operation of the other RF electrodes through the resonance transition, and thus, particularly, in the case of devices in which four RF electrodes carry out optical modulation operation in association such as DP-QPSK modulators, the resonant frequency component having a high powder which is generated in the conductor pattern appears as a synergetic effect of four noises generated in the four RF electrodes respectively and deteriorates high frequency characteristics such as the eye pattern extinction ratio or jitter of optical modulation.

In addition, the above-described resonance transition tends to occur when a plurality of high frequency signals is propagated in parallel in a narrow region and tends to occur as the power of high frequency signals to be input (for example, the amplitude of high frequency signals) is larger. For example, in DP-QPSK modulators to which four high frequency signals are input, high frequency signals having an amplitude that is twice the half-wavelength voltage are input to the respective electrodes, and thus, in constitutions in which the intervals between the lead pins are narrowed using an FPC as described above, the input of high frequency signals with a high power is concentrated in a narrow region, and an environment in which the resonance transition is more likely to occur may be formed.

SUMMARY OF THE INVENTION

Due to the above-described background, in optical modulators including a relay substrate that relays lead pins for inputting high frequency signals and electrodes of an optical modulation element, it is desirable to reduce the influence of the resonance transition between the plurality of conductor patterns formed on the relay substrate and prevent the deterioration of optical modulation characteristics (for example, high frequency characteristics such as eye pattern extinction ratio or jitter).

An aspect of the present invention is an optical modulator including an optical modulation element including a plurality of signal electrodes, a plurality of lead pins for inputting high frequency signals, and a relay substrate on which conductor patterns that electrically connect the lead pins and the signal electrodes are formed. In addition, at least one of the conductor patterns in the optical modulator is constituted so that at least one resonant frequency of the at least one of the conductor patterns is different from at least one resonant frequency of at least one of the other conductor patterns.

According to another aspect of the present invention, the at least one of the conductor patterns is constituted so that at least one resonant frequency of the at least one of the conductor patterns is different from at least one resonant frequency of the conductor pattern adjacent to the at least one of the conductor patterns.

According to another aspect of the present invention, the optical modulator is constituted so that the at least one of the conductor patterns has an electrical length different from that of at least one of the other conductor patterns and thus at least one resonant frequency of the at least one of the conductor patterns is different from a resonant frequency of the at least one of the other conductor patterns.

According to another aspect of the present invention, the optical modulator is constituted so that the at least one of the conductor patterns has a physical length different from a physical length of at least one of the other conductor patterns and thus has an electrical length different from an electrical length of the at least one of the other conductor patterns.

According to another aspect of the present invention, the optical modulator is constituted so that the at least one of the conductor patterns includes a portion having a width different a width of from at least one of the other conductor patterns and thus has an electrical length different from an electrical length of the at least one of the other conductor patterns.

According to another aspect of the present invention, the at least one of the conductor patterns is constituted so that a width of the at least one of the conductor pattern changes in a manner different from a manner in which a width of at least one of the other conductor patterns changes and thus the at least one of the conductor patterns has an electrical length different from an electrical length of the at least one of the other conductor patterns.

According to another aspect of the present invention, the optical modulator is constituted so that the at least one of the conductor patterns includes portions that are divided by one or a plurality of curved portions and a resonant frequency in at least one of the divided portions is different from a resonance frequency of at least one of the other conductor patterns.

According to another aspect of the present invention, the optical modulator is constituted so that the at least one of the conductor patterns includes portions that are connected to each other through an electric component and a resonant frequency in at least one of the portions connected to each other through the electric component is different from at least one resonance frequency of at least one of the other conductor patterns.

According to another aspect of the present invention, at least one of the lead pins is electrically connected to one of the conductor patterns at a part of an outer edge of the relay substrate, the relay substrate has at least one through-hole, and at least one of the other lead pins is inserted through the through-hole and electrically connected to a one of the outer conductor patterns.

According to another aspect of the present invention, the relay substrate has a plurality of through-holes through which the lead pins are inserted respectively, the lead pins are respectively inserted through the through-holes and electrically connected to the respective conductor patterns, the signal electrodes of the optical modulation element are electrically connected to the respective conductor patterns in one side of the relay substrate, and a distance form at least one of the through-holes to the side is different from a distance from the other through-holes to the side.

According to another aspect of the present invention, regarding the electrical length of the at least one of the conductor pattern corresponding to the at least one of the resonant frequencies of the at least one of the conductor patterns and the electrical length of a portion of the at least one of the other conductor pattern corresponding to the at least one of the resonant frequencies of the at least one of the other conductor patterns, one electrical length is not an integral multiple of the other electrical length or, regarding the at least one of the resonant frequencies of the at least one of the conductor patterns and the at least one of the resonant frequencies of the at least one of the other conductor patterns, one resonant frequency is not an integral multiple of the other resonant frequency.

Another aspect of the present invention is an optical transmission apparatus including any one of the above-described optical modulators and an electronic circuit that outputs electrical signals for causing the optical modulator to perform modulation.

BRIEF DESCRIPTION OF THE DRAWINGS

FIG. 2A is a partial detail view of an A portion of the optical modulator illustrated in FIG. 1A.

FIG. 2B is a cross-sectional view of the optical modulator in a direction of a IIB-IIB line in FIG. 1A.

DETAILED DESCRIPTION OF THE INVENTION

Hereinafter, embodiments of the present invention will be described with reference to the accompanying drawings.

First Embodiment

Figure 1A:
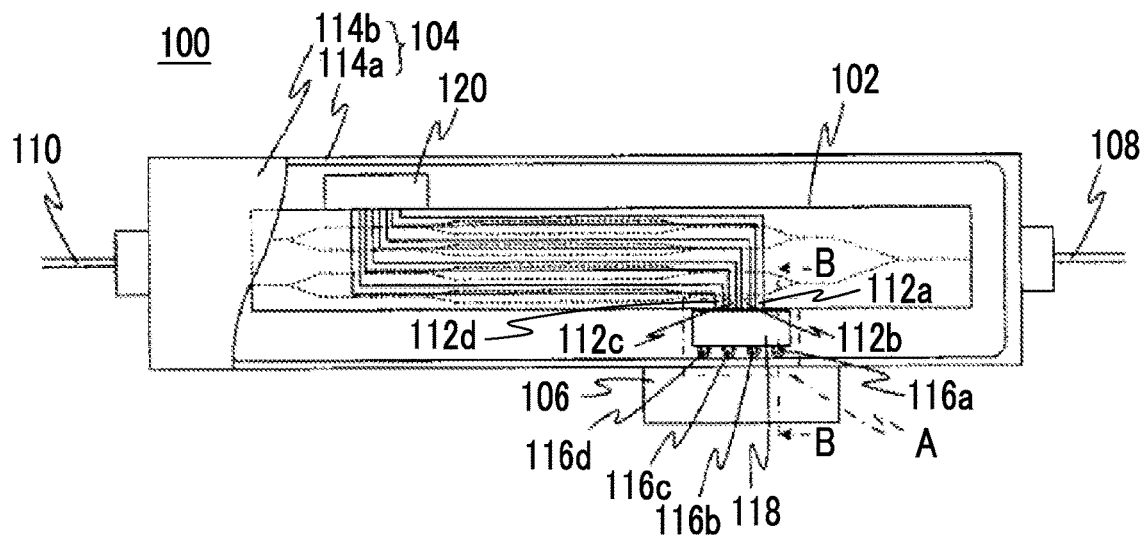
FIG. 1A is a plan view of an optical modulator illustrating a constitution of the optical modulator according to a first embodiment of the present invention.
Figure 1B:
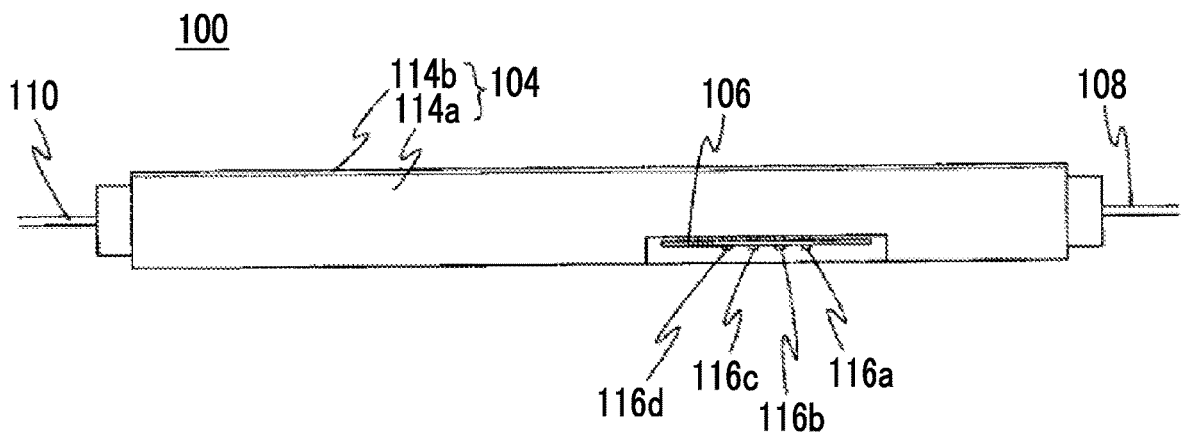
FIG. 1B is a side view of the optical modulator according to the first embodiment of the present invention.
Figure 1C:
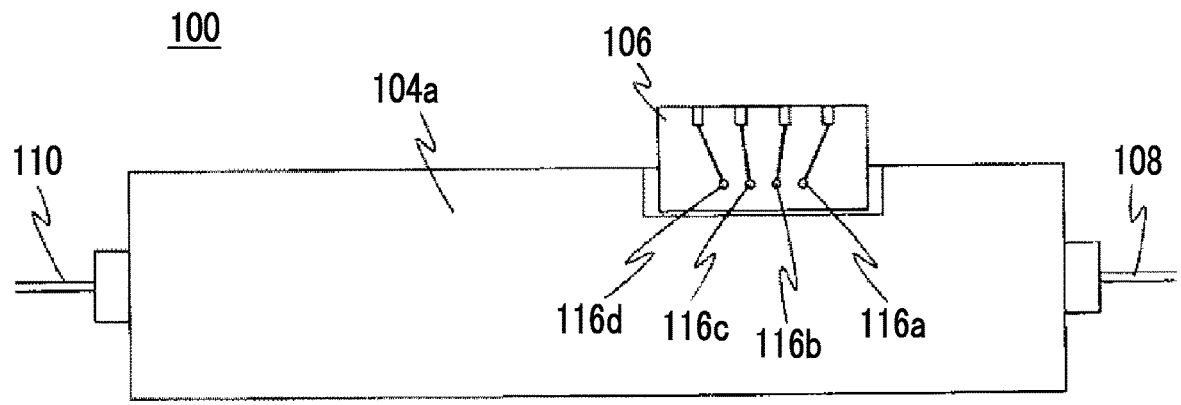
FIG. 1C is a bottom view of the optical modulator according to the first embodiment of the present invention.

FIG. 1A, FIG. 1B, and FIG. 1C are views illustrating the constitution of an optical modulator according to a first embodiment of the present invention. Here, FIG. 1A, FIG. 1B, and FIG. 1C are respectively a plan view, a side view, and a bottom view of the present optical modulator.

The present optical modulator 100 includes an optical modulation element 102, a package case 104 housing the optical modulation element 102, a flexible printed circuit (FPC) 106, an optical fiber 108 for making light incident on the optical modulation element 102, and an optical fiber 110 guiding light output from the optical modulation element 102 to the outside of the package case 104.

The optical modulation element 102 is, for example, a DP-QPSK optical modulator including four Mach-Zehnder-type optical waveguides provided on an LN substrate and four high frequency electrodes (RF electrodes) 112a, 112b, 112c, and 112d which are respectively provided on the Mach-Zehnder-type optical waveguides and modulate light waves propagating through the optical waveguides. Two light rays output from the optical modulation element 102 are polarization-synthesized using, for example, a lens optical system (not illustrated) and are guided to the outside of the package case 104 through the optical fiber 110.

The package case 104 is constituted of a case 114a to which the optical modulation element 102 is fixed and a cover 114b. Meanwhile, in order to facilitate the understanding of the constitution in the package case 104, in FIG. 1A, the cover 114b is only partially illustrated in the left side of the drawing; however, in actual cases, the cover 114b is disposed so as to fully cover the box-shaped case 114a and airtightly seals the inside of the package case 104.

The case 104a is provided with four lead pins 116a, 116b, 116c, and 116d which are conductors for inputting high frequency signals. These lead pins 116a, 116b, 116c, and 116d extend outwards from the bottom surface (the surface illustrated in FIG. 1C) of the package case 104 and are connected to through-holes formed on the FPC 106 by solders, and the like.

Each of the lead pins 116a, 116b, 116c, and 116d is electrically connected to one end of each of the RF electrodes 112a, 112b, 112c, and 112d of the optical modulation element 102 via a relay substrate 118. Meanwhile, the constitution of the relay substrate 118 will be described below.

The other end of each of the RF electrodes 112a, 112b, 112c, and 112d is terminated to one another using a terminator 120.

FIG. 2A is a partial detail view of an A portion of the optical modulator 100 illustrated in FIG. 1A, and FIG. 2B is a cross-sectional view of the optical modulator 100 in a direction of a IIB-IIB line in FIG. 1A. The lead pins 116a, 116b, 116c, and 116d respectively extend toward the outside of the package case 104 from the inside of the package case 104 through the glass sealing portions 200a, 200b, 200c, and 200d provided in the case 104a, protrude from the bottom surface (the surface illustrated in FIG. 1C) of the package case 104, and are solder-fixed to the through-holes in the FPC 106.

The lead pins 116a, 116b, 116c, and 116d are disposed in the vicinity of a side (lead pin-side edge 210) of the relay substrate 118 on the lower side of FIG. 2A (the left side of the relay substrate 118 in FIG. 2B) and are electrically connected to conductor patterns 202a, 202b, 202c, and 202d provided on the relay substrate 118 with solders 204a, 204b, 204c, and 204d respectively.

In addition, the conductor patterns 202a, 202b, 202c, and 202d are electrically connected to RF electrodes 112a, 112b, 112c, and 112d in the lower end portion in the drawing of the optical modulation element 102 (the left end of the optical modulation element 102 in FIG. 2B), which are disposed in the vicinity of a side (modulator-side edge 212) of the relay substrate 118 on the upper side of FIG. 2A (the right side of the relay substrate 118 in FIG. 2B) by, for example, metal wires 206a, 206b, 206c, and 206d respectively.

Meanwhile, the conductor patterns 202a, 202b, 202c, and 202d provided on the relay substrate 118 can be constituted using a well-known line structure as signal lines for high frequencies such as microstrip lines, coplanar lines, or grounded coplanar lines, and a ground pattern can also be provided on the relay substrate 118 according to the structure (not illustrated). In addition, the ground pattern is connected to external ground lines via conductor patterns (not illustrated) on the FPC 106 or the conductive package case 104 and, according to the related art, is connected to patterns for grounding (not illustrated) on the optical modulation element 102 by means of wire bonding or the like.

Due to the above-described constitution, for example, high frequency signals input to the lead pins 116a, 116b, 116c, and 116d from a driving apparatus provided outside the package case 104 (for example, a printed wiring board (PWB) in which a driving circuit is constituted) via the FPC 106 are respectively input to the RF electrodes 112a, 112b, 112c, and 112d of the optical modulation element 102 via the conductor patterns 202a, 202b, 202c, and 202d on the relay substrate 118, and optical modulation operations are carried out in the optical modulation element 102.

In the present embodiment, the RF electrodes 112a, 112b, 112c, and 112d of the optical modulation element 102 are respectively disposed at locations opposite to the lead pins 116a, 116b, 116c, and 116d, and the conductor patterns 202a, 202b, 202c, and 202d on the relay substrate 118 are constituted as linear patterns.

In addition, particularly, in the present embodiment, a width w22 of the conductor patterns 202a, 202b, 202c, and 202d on the relay substrate 118 on the modulator-side edge 212 side is constituted to be wider than a width w21 of the conductor patterns 202a, 202b, 202c, and 202d on the lead pin-side edge 210 side. In addition, lengths L21, L22, L23, and L24 of portions having the width w22 (wide portions) in the conductor patterns 202a, 202b, 202c, and 202d are different from one another, and lengths of portions having the width w21 (narrow portions) in the conductor patterns 202a, 202b, 202c, and 202d are also different from one another.

Therefore, the electrical lengths as distributed constant lines of the respective conductor patterns 202a, 202b, 202c, and 202d are different from one another, and the resonant frequencies of the respective conductor patterns 202a, 202b, 202c, and 202d which are generated from each of a lead pin-side edge 210 edge and a modulator-side edge 212 as reflection ends are different from one another. As a result, the resonance transition of high frequency power among the conductor patterns 202a, 202b, 202c, and 202d is suppressed, and the optical modulation characteristics of the optical modulator 100 are favorably maintained.

Meanwhile, in the present embodiment, the conductor patterns 202a, 202b, 202c, and 202d are constituted so as to have resonant frequencies that are different from one another, but the constitution is not limited thereto, and, for example, at least one of the conductor patterns may be constituted so as to have a different resonant frequency from at least one of the other conductor patterns. For example, it is possible to set the length of the wide portion in at least one of the conductor patterns to be different from the length of the wide portion in at least one of the other conductor patterns (for example, L21=L22=L23≠L24). Even in the above-described constitution, it is possible to exhibit the effect of suppressing resonance transition to a certain extent.

In addition, at least one of the conductor patterns may be constituted to have a different resonant frequency from the other two conductor patterns that are adjacent to the above-described conductor pattern (for example, L22≠L21 and L22≠L23 or (L21=L23)≠(L22=L24)).

As described above, in the present embodiment, the widths of the conductor patterns 202a, 202b, 202c, and 202d are changed stepwise, thereby making the electrical lengths of the conductor patterns 202a, 202b, 202c, and 202d different from one another. Therefore, the resonant frequencies of the conductor patterns 202a, 202b, 202c, and 202d are made different from one another, and resonance transition between the conductor patterns 202a, 202b, 202c, and 202d is prevented.

Here, the aspect of the change in the widths of the respective conductor patterns is not limited to the step-shape change between the width w21 and the width w22 as in the present embodiment, and arbitrary aspects can be employed as long as resonant frequencies can be made different from one another by making the electrical lengths of a plurality of conductor patterns different from one another. For example, the widths of the respective conductor patterns may be gradually changed so as to be different from one another (for example, the change ratio of the width per unit length between each set of the conductor patterns is different) or may be changed in a more complicated multistep manner than in the constitution of the respective conductor patterns in FIG. 2A (two-step constitution) (for example, the lengths of the conductor patterns in individual steps are different from one another). In addition, for example, each of the conductor patterns may be constituted of one or a plurality of portions having the width w21 and mutually different lengths and one or a plurality of portions having the width w22 and mutually different lengths. Furthermore, the plurality of conductor patterns may have widths that are different from one another.

Meanwhile, in the present embodiment, as described above, the resonant frequencies of the plurality of conductor patterns are made different from one another, and resonance transition is prevented by partially changing the widths of the plurality of conductor patterns so as to make the electrical lengths different from one another, but the aspect is not limited thereto, and the electrical lengths may be made different from one another by making the physical lengths of the plurality of conductor patterns different from one another. In this case, the skew of high frequency signal propagation between the plurality of conductor patterns increases, but the above-described skew can be compensated using a digital signal processor (DSP) or the like in electronic circuits (driving circuit, drive circuit) that output signals for causing modulation operation in the optical modulator 100.

In addition, in the present embodiment, the plurality of conductor patterns each have one resonant frequency that is different from resonant frequencies of the other conductor patterns, but the aspect is not limited thereto, and the optical modulator may be constituted so that each of the conductor patterns has a plurality of resonant frequencies, and at least one resonance frequency of at least one of the conductor patterns is different from at least one resonant frequency of at least one of the other conductor patterns. Even in the above-described constitution, it is possible to suppress resonance transition between the plurality of conductor patterns to a certain extent.

Next, a modification example of the first embodiment will be described using FIGS. 3 and 4. A relay substrate described below can be used in the optical modulator 100 instead of the relay substrate 118.

First Modification Example

First, a first modification example will be described.

In the relay substrate 118 illustrated in FIG. 2A, the electrical lengths of the linear conductor patterns 202a, 202b, 202c, and 202d are made different from one another, whereby the resonant frequencies of the conductor patterns are made different from one another, and thus resonance transition between the conductor patterns is prevented.

In contrast, in the present embodiment, a relay substrate is constituted so that a curved portion is provided to each of the plurality of conductor patterns and the physical lengths of portions divided by the curved portion are made different from one another among the conductor patterns.

Since the curved portion provided in each of the conductor patterns functions as a reflection point of high frequencies, each of the conductor patterns has a plurality of resonant frequencies, and the physical lengths of the portions divided by the curved portion are different from one another among the conductor patterns, and thus the plurality of resonant frequencies of each of the conductor patterns become different from one another among the conductor pattern. As a result, the resonance transition of high frequency power between the conductor patterns is reduced, suppressed, or prevented.

Figure 3:
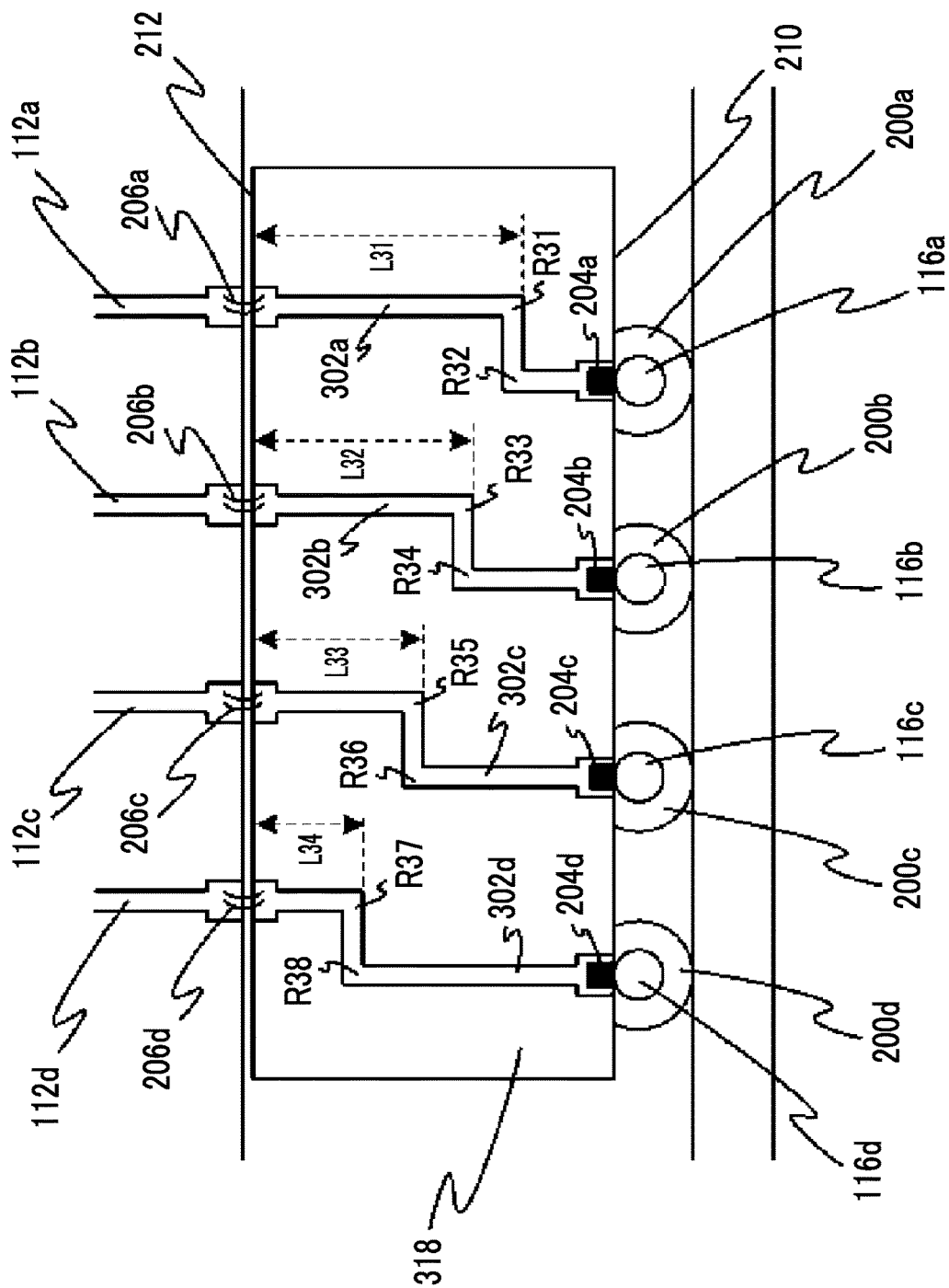
FIG. 3 is a view illustrating a first modification example of a relay substrate in the optical modulator according to the first embodiment illustrated in FIG. 2A.

FIG. 3 is a view illustrating the constitution of a relay substrate 318 according to the present modification example, which can be used instead of the relay substrate 118, using a partial detail view corresponding to FIG. 2A. In FIG. 3, for the same constituent elements as in the relay substrate 118 illustrated in FIG. 2A, the same reference sign as the reference sign in FIG. 2A will be used, and the above description of FIG. 2A will be incorporated herein.

The relay substrate 318 illustrated in FIG. 3 has the same constitution as the relay substrate 118 illustrated in FIG. 2A; however, instead of the conductor patterns 202a, 202b, 202c, and 202d, has conductor patterns 302a, 302b, 302c, and 302d that are disposed in a different manner from the above-described conductor patterns. Here, the locations of the RF electrodes 112a, 112b, 112c, and 112d of the optical modulation element 102 are moved to the right-hand side of the drawing (for example, in a direction along the lead pin-side edge 210 or the modulator-side edge 212) by a predetermined distance from the locations facing the lead pins 116a, 116b, 116c, and 116d. The above-described constitution is realized by, for example, deviating the mounting location of the optical modulation element 102 to the right-hand side of the drawing the predetermined distance during the mounting of the optical modulation element 102 in the case 104a. Meanwhile, in the example illustrated in FIG. 3, the locations of all of the RF electrodes 112a, 112b, 112c, and 112d are moved in the direction along the lead pin-side edge 210 or the modulator-side edge 212 by the predetermined distance, but the predetermined distance may not be the same for all of the RF electrodes. For example, the intervals between the RF electrodes 112a, 112b, 112c, and 112d of the optical modulation element 102 may be set to be uneven, and the locations of the RF electrodes 112a, 112b, 112c, and 112d are respectively moved from the locations facing the lead pins 116a, 116b, 116c, and 116d predetermined distances that are different from one another.

The respective conductor patterns 302a, 302b, 302c, and 302d in the relay substrate 318 have two curved portions R31 and R32, R33 and R34, R35 and R36, and R37 and R38, respectively. In addition, the RF electrodes 112a, 112b, 112c, and 112d are connected to the corresponding lead pins 116a, 116b, 116c, and 116d by respectively providing portions which extend in the horizontal direction of the drawing a predetermined distance between the two curved portions.

Particularly, in the present modification example, distances L31, L32, L33, and L34 from the modulation-side edge 212 to the closest curved portions R31, R33, R35, and R37 in the respective conductor patterns 302a, 302b, 302c, and 302d are different from one another, and distances from the lead pin-side edge 210 to the closest curved portions R32, R34, R36, and R38 are also different from one another.

As described above, the curved portions of the conductor patterns function as the reflection points of high frequency signals, and thus the respective conductor patterns 302a, 302b, 302c, and 302d have resonant frequencies generated by the reflection by the lead pin-side edge 210 and the curved portions R32, R34, R36, and R38 and resonant frequencies generated by the reflection by the modulator-side edge 212 and the curved portions R31, R33, R35, and R37.

In addition, since the distances L31, L32, L33, and L34 from the modulation-side edge 212 to the closest curved portions R31, R33, R35, and R37 are different from one another, and the distances from the lead pin-side edge 210 to the closest curved portions R32, R34, R36, and R38 are also different from one another, the resonant frequencies generated by the reflection by the lead pin-side edge 210 and the curved portions R32, R34, R36, and R38 and the resonant frequencies generated by the reflection by the modulator-side edge 212 and the curved portions R31, R33, R35, and R37 become different from one another among the conductor patterns.

As a result, the resonance transition of high frequency power among the conductor patterns 302a, 302b, 302c, and 302d is prevented. In addition, in the present modification example, the physical lengths of the conductor patterns 302a, 302b, 302c, and 302d are the same as one another, and thus it is possible to set the skew of high frequency signals propagating through the respective conductor patterns 302a, 302b, 302c, and 302d to almost zero. Meanwhile, regarding resonance caused by the end surface reflection at the lead pin-side edge 210 and the end surface reflection at the modulator-side edge 212 in the respective conductor patterns 302a, 302b, 302c, and 302d, since the curved portions R31 and the like provided in the respective conductor patterns function as high frequency loss portions, the Q value of the resonance decreases, and thus it is possible to decrease the contribution of the total electrical length of the conductor patterns 302a and the like including the curved portions R31 and the like to the resonance.

In addition, in the present modification example, the portion between the curved portions R31 and R32 in the conductor pattern 302a, the portion between the curved portions R33 and R34 in the conductor pattern 302b, the portion between the curved portions R35 and R36 in the conductor pattern 302c, the portion between the curved portions R37 and R38 in the conductor pattern 302d are constituted to have the same physical length since the distances are short and the resonance frequencies in the portions are outside the operation frequency range of the optical modulation element 102. Here, the portions may be constituted to have the physical lengths that become different from one another.

Furthermore, in the present modification example, the respective conductor patterns 302a, 302b, 302c, and 302d have constant widths, but may be constituted so that the respective portions divided by the curved portions R31 and the like have widths that become different from one another among the conductor patterns. More specifically, the portions from the curved portions R31, R33, R35, and R37 to the modulator-side edge 212 may be constituted to have widths that are different from one another among the conductor patterns, the portions from the curved portions R31, R33, R35, and R37 to the portions from the curved portions R32, R34, R36, and R38 may be constituted to have widths that are different from one another among the conductor patterns, or the portions from the curved portions R32, R34, R36, and R38 to the lead pin-side edge 210 may be constituted to have widths that are different from one another among the conductor patterns. In this case, even when the respective portions constituted to have widths that are different from one another among the conductor patterns may be constituted to have the same physical length among the conductor patterns (for example, in a case in which the portions from the curved portions R31, R33, R35, and R37 to the modulator-side edge 212 are constituted to have widths that are different from one another among the conductor patterns, L31=L32=L33=L34), the electrical lengths of the respective portions become different from one another, and thus the resonant frequencies of the respective conductor patterns become different from one another, and it is possible to prevent resonance transition.

In addition, in the present modification example, all of the distances L31, L32, L33, and L34 from the modulation-side edge 212 to the closest curved portions R31, R33, R35, and R37 in the respective conductor patterns 302a, 302b, 302c, and 302d are made different from one another, and the respective conductor patterns 302a, 302b, 302c, and 302d are provided with resonant frequencies that are different from one another (at least in the operation frequency range of the optical modulator 102), but the aspect is not limited thereto, and, even when the distances L31, L32, L33, and L34 between at least conductor patterns adjacent to each other are made different from one another (for example, (L31=L33)≠ (L32=L34)), and thus the resonant frequencies are made different from one another among the adjacent conductor patterns, it is possible to suppress resonance transition to a certain extent.

In addition, in the present modification example, the respective conductor patterns 302a, 302b, 302c, and 302d have resonant frequencies that are different from one another, but the aspect is not limited thereto, and the relay substrate may be constituted so that at least one of the resonant frequencies of at least one of the conductor patterns becomes different from at least one of the resonant frequencies of at least one of the other conductor patterns. Even in the above-described constitution, it is possible to reduce or prevent the deterioration of optical modulation characteristics by reducing the influence of resonance transition between the conductor patterns to a certain extent. In this case, the at least one of the other conductor patterns is desirably a conductor pattern that is adjacent to the at least one of the conductor patterns.

For example, the relay substrate can be constituted so that, in one conductor pattern, the electrical length (for example, the physical length or the width) of at least one of the portions divided by at least one curved portion is different from the electrical length of at least one of the portions divided by at least one of the curved portion in at least one of the other conductor patterns.

In addition, in the present modification example, FIG. 3 illustrates that the two curved portions in the respective conductor patterns 302a, 302b, 302c, and 302d curve the corresponding conductor pattern at 90 degrees, but the aspect is not limited thereto, and relay substrate the curved portions can be constituted of a curved line having a finite curvature radius. In addition, it is possible to set the curving angles of the curved portions to arbitrary angles as long as high frequency reflection that contributes to resonance occurs in the curved portions.

Second Modification Example

Next, a second modification example of the relay substrate 118 that is used in the optical modulator 100 illustrated in FIG. 1 will be described.

In the relay substrate 118 illustrated in FIG. 2A, each of the conductor patterns 202a, 202b, 202c, and 202d includes the wide portion and the narrow portion, the lengths of the wide portions and the narrow portions are made different from one another among the conductor patterns, and the electrical lengths of the respective conductor patterns are made different from one another, whereby the resonant frequencies of the conductor patterns are made different from one another, and resonance transition between the conductor pattern is prevented.

In constant, in a relay substrate of the present modification example, similar to the relay substrate 118, each of the plurality of conductor patterns includes a wide portion and a narrow portion, the lengths of the wide portions and the lengths of the narrow portions are made different from one another among the conductor patterns, and furthermore, the wide portion and the narrow portion are connected to each other via an electric component (for example, a high-pass filter or band-pass filter constituted of a manual electric component). The connection points between the electric component and the wide portion and between the electric component and the narrow portion respectively function as reflection points of high frequencies and cause resonance in both the wide portion and the narrow portion, and thus, in the present modification example, each of the plurality of conductor patterns has a plurality of resonant frequencies (a resonant frequency in the wide portion and a resonant frequency in the narrow portion). In addition, since the lengths of the wide portions and the lengths of the narrow portions are made different from one another among the conductor patterns, the plurality of resonance frequencies in each of the plurality of conductor patterns becomes different from one another among the conductor patterns, and the resonance transition of high frequency power between the conductor patterns is prevented.

Figure 4:
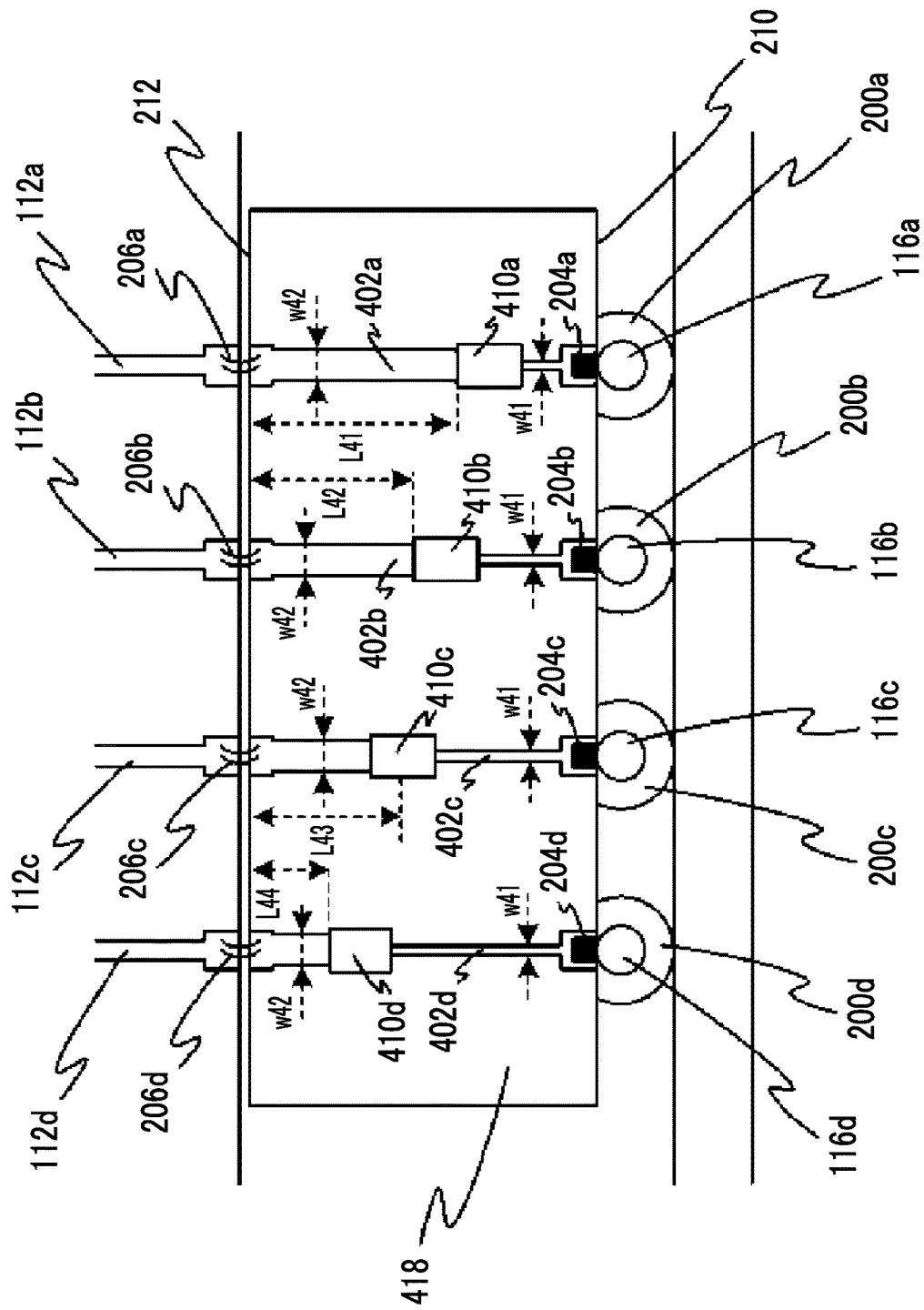
FIG. 4 is a view illustrating a second modification example of the relay substrate in the optical modulator according to the first embodiment illustrated in FIG. 2A.

FIG. 4 is a view illustrating the constitution of a relay substrate 418 according to the present modification example, which can be used instead of the relay substrate 118, using a partial detail view corresponding to FIG. 2A. In FIG. 4, for the same constituent elements as in the relay substrate 118 illustrated in FIG. 2A, the same reference sign as the reference sign in FIG. 2A will be used, and the above description of FIG. 2A will be incorporated herein.

The relay substrate 418 illustrated in FIG. 4 has the same constitution as the relay substrate 118 illustrated in FIG. 2A; however, instead of the conductor patterns 202a, 202b, 202c, 202d, includes linear conductor patterns 402a, 402b, 402c, and 402d having a different constitution from these conductor patterns.

Each of the conductor patterns 402a, 402b, 402c, and 402d is constituted of a narrow portion having a width w41 which extends from the lead pin-side edge 210 and a wide portion having a width w42 that is wider than the width w41 which extends from the modulator-side edge 212. In addition, in each of the conductor patterns 402a, 402b, 402c, and 402d, the narrow portion and the wide portion are electrically connected to each other though an electric component 410a, 410b, 410c, or 410d (that is, the space between the wide portion and the narrow portion forms a gap portion, and the wide portion and the narrow portion are connected to each other via the electric component with the gap sandwiched therebetween). Furthermore, the respective wide portions of the conductor patterns 402a, 402b, 402c, and 402d have lengths L41, L42, L43, and L44 that are different from one another, and the respective narrow portions of the conductor patterns 402a, 402b, 402c, and 402d also have lengths that are different from one another Therefore, the electrical lengths of the wide portions and the narrow portions in the respective conductor patterns 402a, 402b, 402c, and 402d become different from one another among the conductor patterns, and thus it is possible to prevent resonance transition between the conductor patterns 402a, 402b, 402c, and 402d by making the respective resonant frequencies of the wide portions and the narrow portions different from one another among the conductor patterns.

Particularly, in the present modification example, since the wide portions and the narrow portions are electrically connected to each other via the electric components in the respective conductor patterns 402a, 402b, 402c, and 402d, the respective conductor patterns 402a, 402b, 402c, and 402d are considered to be constituted of two independent distributed constant lines that are divided by the gap portions. Therefore, resonance attributed to reflection at both end portions (an end portion in the lead pin-side edge 210 and an end portion in the modulator-side edge 212) of the respective conductor patterns 402a, 402b, 402c, and 402d does not occur, and it is possible to more effectively prevent resonance transition than in the relay substrate 118 illustrated in FIG. 2A.

Meanwhile, as the electric components 410a, 410b, 410c, and 410d, it is possible to use, for example, a high-pass filter (low-cut filter), a band-pass filter or low-pass filter (high-cut filter), or other passive components which transmit high frequency signals in operation frequency ranges necessary for optical modulation. In addition, in a case in which the electric components provided in the respective conductor patterns function as high frequency loss portions, the Q value of the resonance decreases and thus can be substantially ignored.

In addition, in the present modification example, the electric components L410a and the like are provided to all of the conductor patterns 402a, 402b, 402c, and 402d, but the relay substrate may be constituted in the same manner as in FIG. 2A by providing an electric component to at least one of the conductor patterns and not providing electric components to the other conductor patterns.

Second Embodiment

Figure 5:
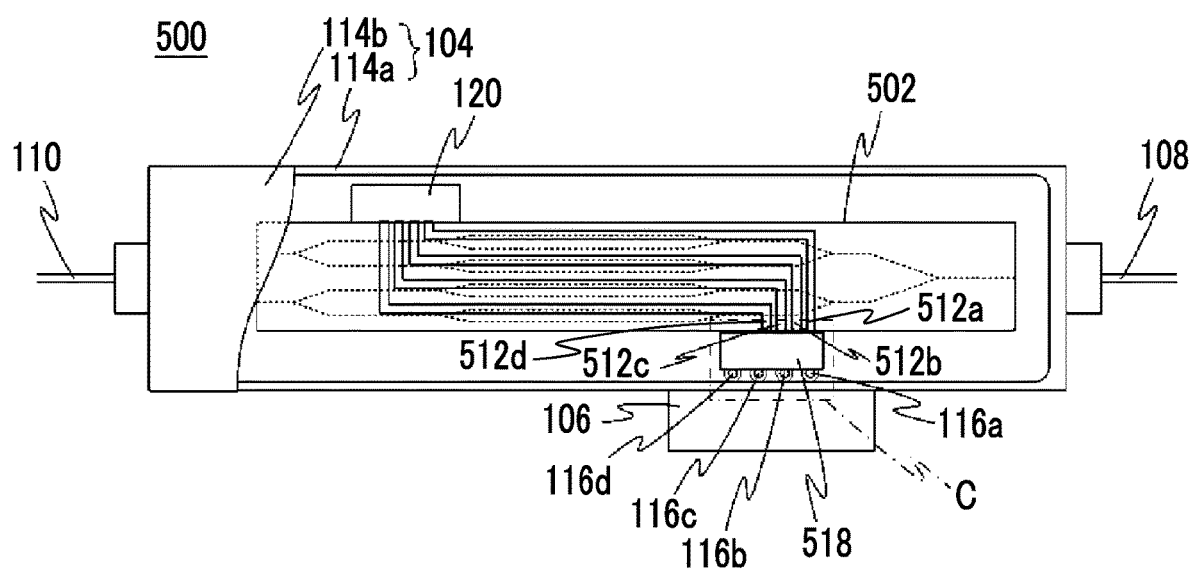
FIG. 5 is a plan view of a constitution of an optical modulator according to a second embodiment of the present invention.

Next, a second embodiment of the present invention will be described. FIG. 5 is a view illustrating the constitution of an optical modulator according to the second embodiment of the present invention. In FIG. 5, for the same constituent elements as in the optical modulator 100 according to the first embodiment illustrated in FIG. 1A, the same reference sign as the reference sign in FIG. 1A will be used, and the above description of the first embodiment will be incorporated herein.

An optical modulator 500 according to the present embodiment illustrated in FIG. 5 has the same constitution as the optical modulator 100 according to the first embodiment, but has an optical modulation element 502 instead of the optical modulation element 102 and a relay substrate 518 instead of the relay substrate 118. The optical modulation element 502 has the same constitution as the optical modulation element 102, but includes RF electrodes 512a, 512b, 512c, and 512d instead of the RF electrodes 112a, 112b, 112c, and 112d. The RF electrodes 512a, 512b, 512c, and 512d have the same constitution as the RF electrodes 112a, 112b, 112c, and 112d, but the intervals between the RF electrodes 512a, 512b, 512c, and 512d disposed at the edge of the optical modulation element 502 on the relay substrate 518 side are narrower than the intervals between the lead pins 116a, 116b, 116c, and 116d.

Figure 6:
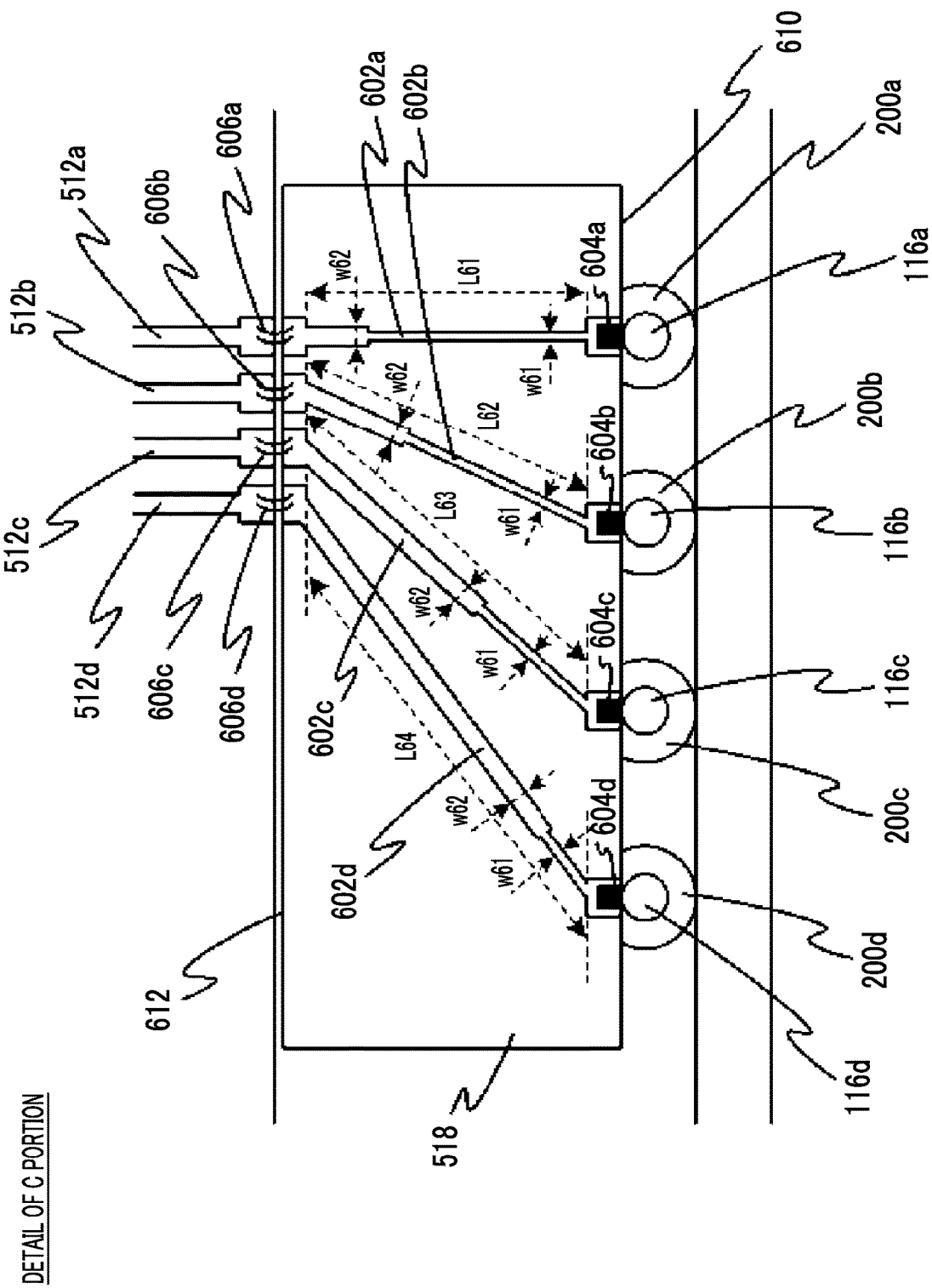
FIG. 6 is a partial detail view of a C portion of the optical modulator illustrated in FIG. 5.

FIG. 6 is a partial detail view of a C portion in the optical modulator 500 illustrated in FIG. 5. The relay substrate 518 has the same constitution as the relay substrate 118; however, instead of the conductor patterns 202a, 202b, 202c, 202d, includes conductor patterns 602a, 602b, 602c, and 602d that are disposed in a different manner from the above-described conductor patterns. The conductor patterns 602a, 602b, 602c, and 602d are respectively electrically connected to the lead pins 116a, 116b, 116c, and 116d with solders 604a, 604b, 604c, and 604d at the side of the relay substrate 518 on the lower side of the drawing (a lead pin-side edge 610).

In addition, the conductor patterns 602a, 602b, 602c, and 602d are respectively electrically connected to the RF electrodes 512a, 512b, 512c, and 512d of the optical modulation element 502 by, for example, metal wires 606a, 606b, 606c, and 606d at the side of the relay substrate 518 on the upper side of the drawing (a modulator-side edge 612) in FIG. 6.

Particularly, in the present embodiment, each of the conductor patterns 602a, 602b, 602c, and 602d has a linear shape and is constituted of a narrow portion having a width w61 which extends from the lead pin-side edge 210 and a wide portion having a width w62 that is wider than the width w61 which extends from the modulator-side edge 612. In addition, the wide portions are constituted to have lengths that are different from one another among the conductor patterns 602a, 602b, 602c, and 602d and the narrow portions are also constituted to have lengths that are different from one another.

Furthermore, since the intervals between the RF electrodes 512a, 512b, 512c, and 512d the intervals between the lead pins 116a, 116b, 116c, and 116d are different from each other, the conductor patterns 602a, 602b, 602c, and 602d extend from the lead pin-side edge 610 to the modulator-side edge 612 at slopes that are different from one another and thus have physical lengths L61, L62, L63, and L64 that are different from one another.

Therefore, the electrical lengths of the respective conductor patterns 602a, 602b, 602c, and 602d become more different from one another than the conductor patterns 202a, 202b, 202c, and 202d illustrated in FIG. 2A, and resonant frequencies generated from each of the lead pin-side edge 610 and the modulator-side edge 612 as reflection ends in the respective conductor patterns 602a, 602b, 602c, and 602d become significantly different from one another. As a result, the resonance transition of high frequency power between the conductor patterns 602a, 602b, 602c, and 602d is further suppressed.

Next, a modification example of the second embodiment will be described. The present modification example is a relay substrate in which the constituent characteristics of the conductor patterns illustrated in FIGS. 2A, 3, 4, and 6 are combined together.

Figure 7:
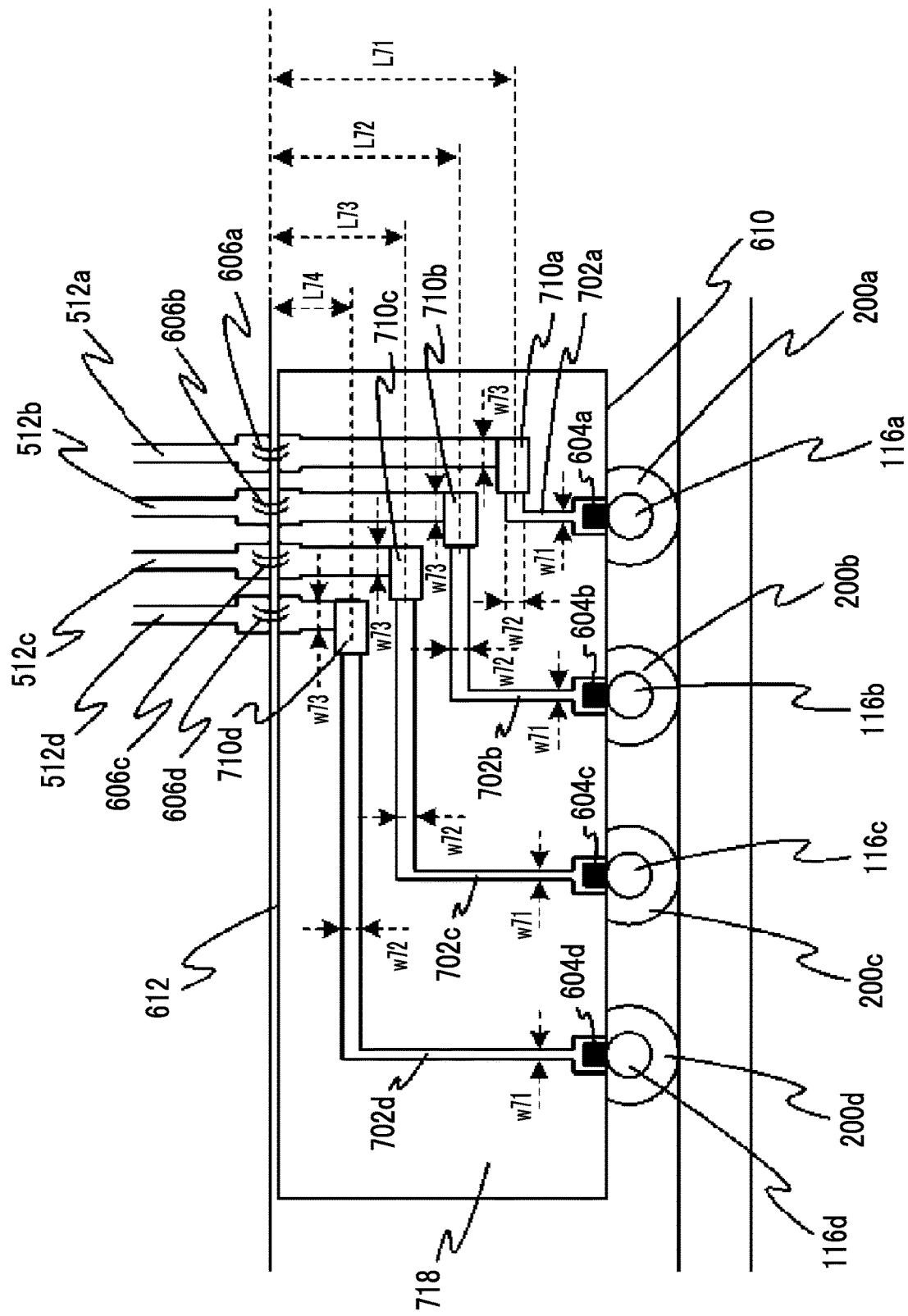
FIG. 7 is a view illustrating a modification example of a relay substrate in the optical modulator according to the second embodiment illustrated in FIG. 6.

FIG. 7 is a view illustrating the constitution of a relay substrate 718 according to the present modification example, which can be used instead of the relay substrate 518, using a partial detail view corresponding to FIG. 6. In FIG. 7, for the same constituent elements as in the relay substrate 518 illustrated in FIG. 6, the same reference sign as the reference sign in FIG. 6 will be used, and the above description of FIG. 6 will be incorporated herein.

The relay substrate 718 illustrated in FIG. 7 has, instead of the conductor patterns 602a, 62b, 602c, and 602d in the relay substrate illustrated in FIG. 6, has conductor patterns 702a, 702b, 702c, and 702d that are disposed in a different manner from the above-described conductor patterns.

The conductor patterns 702a, 702b, 702c, and 702d respectively have two curved portions and portions that extend in the horizontal direction of the drawing (for example, in a direction along the lead pin-side edge 610 or the modulator-side edge 612). In addition, distances L71, L72, L73, and L74 of the respective conductor patterns 702a, 702b, 702c, and 702d from the modulation-side edge 612 to the closest curved portions are different from one another, and thus distances from the lead pin-side edge 610 to the closest curved portions are also different from one another. In addition, in the respective conductor patterns 702a, 702b, 702c, and 702d, the lengths of portions that are sandwiched by the two curved portions (that is, the portions that extend in the horizontal direction of the drawing) are also different from one another.

In addition, the conductor patterns 702a, 702b, 702c, and 702d are respectively maintained electrically conductive at the curved portions close to the modulator-side edge 612 via electric components 710a, 710b, 710c, and 710d (that is, the conductor patterns 702a, 702b, 702c, and 702d have a gap in the respective curved portions, and the conductor portions facing each other with the gap therebetween are connected to each other by the corresponding electric component 710a and the like).

Furthermore, in the conductor patterns 702a, 702b, 702c, and 702d, portions that extend from the lead pin-side edge 610 to the closes curved portions have a width w71, and portions that extend from the modulator-side edge 612 to the closes curved portions have a width w73 that is wider than the width w71, and the portions sandwiched by the two curved portions have a width w72 that is wider than the width w71 but narrower than the width w73.

Therefore, in the respective conductor patterns 702a, 702b, 702c, and 702d, resonant frequencies in the portions having the width w71, the portions having the width w72, and the portions having the width w73 become different from one another, and thus the resonance transition of high frequency power between the conductor patterns 702a, 702b, 702c, and 702d, is effectively prevented. In addition, the conductor patterns 702a, 702b, 702c, and 702d have the gap portion in apart thereof, and the portions facing each other with the gap portion therebetween are electrically connected by the electric components 710a and the like, and thus resonance attributed to reflection at both end portions (an end portion in the lead pin-side edge 610 and an end portion in the modulator-side edge 612) of the respective conductor patterns 702a, 702b, 702c, and 702d does not occur, and resonance transition is more effectively prevented.

Meanwhile, in the present modification example, the electric components L710a and the like are provided to all of the conductor patterns 702a, 702b, 702c, and 702d, but the relay substrate may be constituted in the same manner as the conductor patterns 302a and the like in FIG. 3 by providing an electric component to at least one of the conductor patterns and not providing electric components to the other conductor patterns.

In addition, in the present modification example, the portions having the width w73 and the portions having the width w72 of the respective conductor patterns 702a, 702b, 702c, and 702d which are divided by the electric components 710a, 710b, 710c, and 710d respectively have the electrical lengths that are different from one another among the conductor patterns and have resonant frequencies that are different from one another, but the aspect is not limited thereto, and the relay substrate may be constituted so that the resonant frequency in at least one portion divided by the electric component in at least one of the conductor patterns is different from at least one resonant frequency of at least one of the other conductor patterns.

For example, it is possible to constitute the relay substrate using the conductor pattern 702a divided by the electric component 710a and the conductor patterns 302b, 302c, and 302d in FIG. 3 and make the resonant frequencies of the portion having the width w73 and the portion having the width w72 of the conductor pattern 702a which are divided by the electric component 710a different from at least one resonant frequency of at least one of the other conductor patterns (that is, any one of the conductor patterns 302b, 302c, and 302d). In this case, the at least one of the other conductor patterns is desirably a conductor pattern that is adjacent to the conductor pattern 702a.

Third Embodiment

Figure 8:
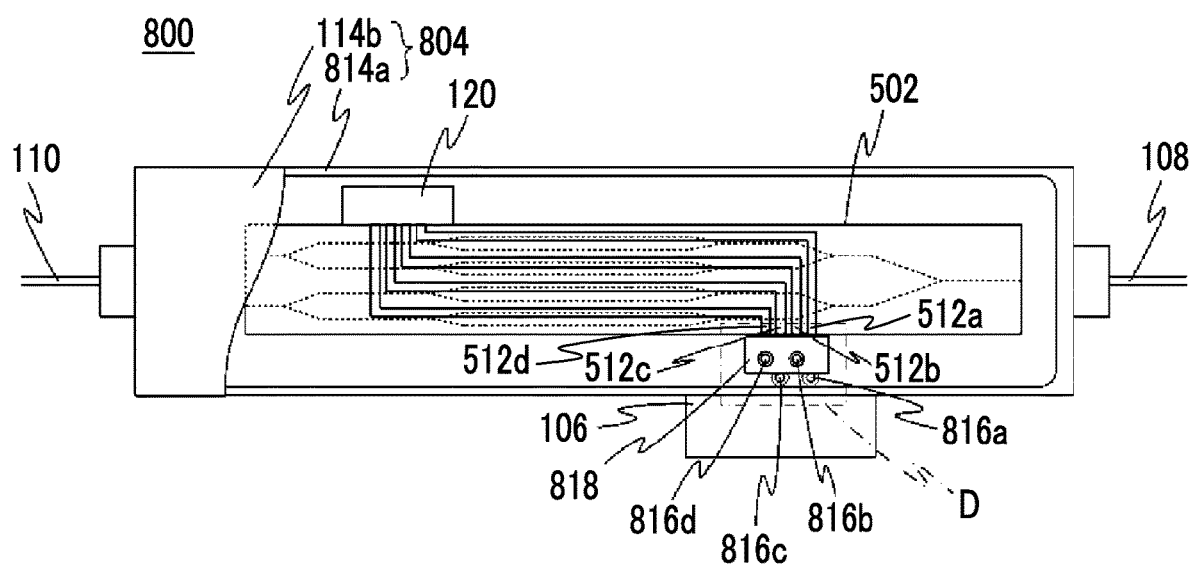
FIG. 8 is a plan view of a constitution of an optical modulator according to a third embodiment of the present invention.

Next, a third embodiment of the present invention will be described. FIG. 8 is a view illustrating the constitution of an optical modulator according to the third embodiment of the present invention. In FIG. 8, for the same constituent elements as in the optical modulator 500 according to the second embodiment illustrated in FIG. 5, the same reference sign as the reference sign in FIG. 5 will be used, and the above description of the second embodiment will be incorporated herein.

An optical modulator 800 according to the present embodiment illustrated in FIG. 8 has the same constitution as the optical modulator 500 according to the second embodiment, but has a package case 804 including a case 814a instead of the package case 104 including the case 114a. The case 814a has the same constitution as the case 114a, but includes lead pins 816a, 816b, 816c, and 816d instead of the lead pins 116a, 116b, 116c, and 116d.

The lead pins 816a, 816b, 816c, and 816d have the same constitution as the lead pins 116a, 116b, 116c, and 116d, but are disposed at locations facing the RF electrodes 512a, 512b, 512c, and 512d of the optical modulation element 502 (at locations matching those of the corresponding RF electrodes in the horizontal direction) and are disposed so that distances to the corresponding RF electrodes are different between the lead pins that are adjacent to each other (that is, the lead pins 816a, 816b, 816c, and 816d are disposed in a zigzag shape in the horizontal direction (for example, in the length direction of the optical modulation element 502)). In addition, the optical modulator 800 includes a relay substrate 818 instead of the relay substrate 518.

Figure 9:
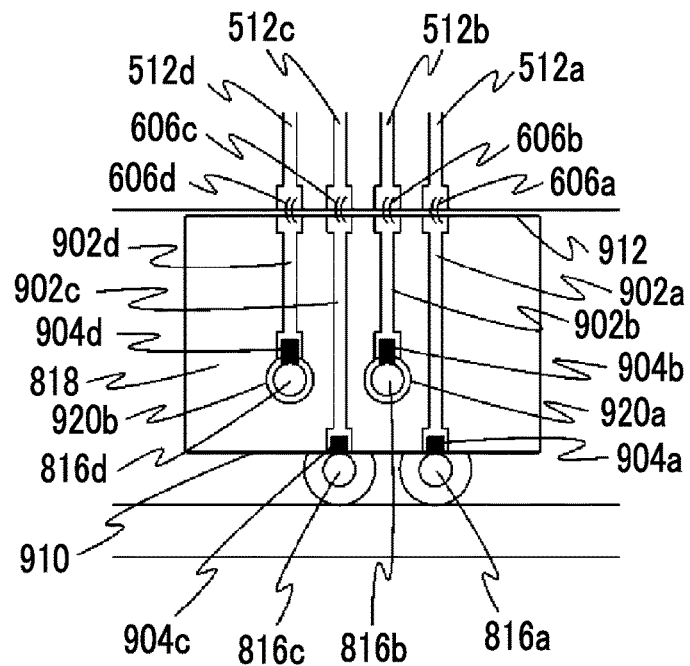
FIG. 9 is a partial detail view of a D portion of the optical modulator illustrated in FIG. 8.

FIG. 9 is a partial detail view of a D portion in the optical modulator 800 illustrated in FIG. 8. The relay substrate 818 has the same constitution as the relay substrate 518; however, instead of the conductor patterns 602a, 602b, 602c, 602d, includes conductor patterns 902a, 902b, 902c, and 902d that are disposed in a different manner from the above-described conductor patterns. The conductor patterns 902a and 902c are respectively electrically connected to the lead pins 816a and 816c with solders 904a and 904c at the side of the relay substrate 818 on the lower side of the drawing (a lead pin-side edge 910). In addition, the conductor patterns 902b and 902d are respectively electrically connected to the lead pins 816b and 816d which are inserted through holes (through-holes) 920a and 920b provided in the relay substrate 818 with solders 904b and 904d.

In addition, the conductor patterns 902a, 902b, 902c, and 902d are respectively electrically connected to the RF electrodes 512a, 512b, 512c, and 512d of the optical modulation element 502 by, for example, the metal wires 606a, 606b, 606c, and 606d at the side of the relay substrate 818 on the upper side of the drawing (a modulator-side edge 912) in FIG. 9.

As described above, the lead pins 816a, 816b, 816c, and 816d are disposed at the locations facing the RF electrodes 512a, 512b, 512c, and 512d of the optical modulation element 502 (the locations matching those of the corresponding RF electrodes in the horizontal direction) and are disposed so that the distances to the corresponding RF electrodes are different between the lead pins that are adjacent to each other. Therefore, the relay substrate is constituted so that the physical lengths of the respective conductor patterns 902a, 902b, 902c, and 902d are different between the conductor patterns that are adjacent to each other.

Therefore, in the present embodiment, resonant frequencies are made different from each other between, among the conductor patterns 902a, 902b, 902c, and 902d, the conductor patterns that are adjacent to each other, whereby it is possible to prevent the resonance transition of high frequency power between the conductor patterns that are adjacent to each other. Meanwhile, in the present embodiment, the lead pins 816a, 816b, 816c, 816d are disposed in a zigzag shape, the lead pins 816a and 816c are electrically connected to the conductor patterns 902a and 902c at a part (the side in the lower side of FIG. 9) of the outer circumference of the relay substrate 818, and the lead pins 816b and 816d are inserted through the holes 920a and 920b provided in the relay substrate 818 and are connected to the conductor patterns 902b and 902d, but the aspect is not limited thereto, and other constitutions can be employed as long as the electrical length of at least one conductor pattern among the conductor patterns 902a, 902b, 902c, and 902d is different from the electrical lengths of the other conductor patterns. For example, it is possible to electrically connect at least one of the lead pins to one of the conductor patterns at the part of the outer circumference of the relay substrate and insert at least one of the other lead pins through a through-hole provided in the relay substrate and electrically connect the lead pin to one of the other conductor patterns.

Fourth Embodiment

Next, a fourth embodiment of the present invention will be described.

Figure 10:
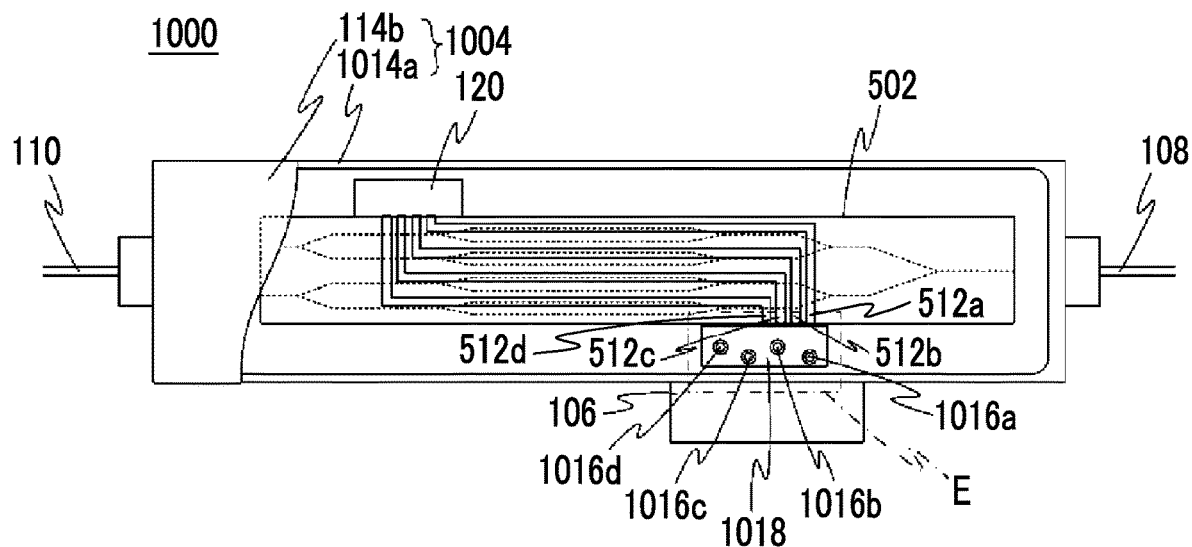
FIG. 10 is a plan view of a constitution of an optical modulator according to a fourth embodiment of the present invention.

FIG. 10 is a view illustrating the constitution of an optical modulator according to the fourth embodiment of the present invention. In FIG. 10, for the same constituent elements as in the optical modulator 500 according to the second embodiment illustrated in FIG. 5, the same reference sign as the reference sign in FIG. 5 will be used, and the above description of the second embodiment will be incorporated herein.

An optical modulator 1000 according to the present embodiment illustrated in FIG. 10 has the same constitution as the optical modulator 500 according to the second embodiment, but has a package case 1004 including a case 1014a instead of the package case 104 including the case 114a. The case 1014a has the same constitution as the case 114a, but includes lead pins 1016a, 1016b, 1016c, and 1016d instead of the lead pins 116a, 116b, 116c, and 116d.

The lead pins 1016a, 1016b, 1016c, and 1016d have the same constitution as the lead pins 116a, 116b, 116c, and 116d, but are disposed in a zigzag shape in the horizontal direction (for example, the length direction of the optical modulation element 502)) and are disposed so that the intervals therebetween become wider than the disposition intervals between the RF electrodes 512a, 512b, 512c, and 512d of the optical modulation element 502. In addition, the optical modulator 1000 includes a relay substrate 1018 instead of the relay substrate 518.

Figure 11:
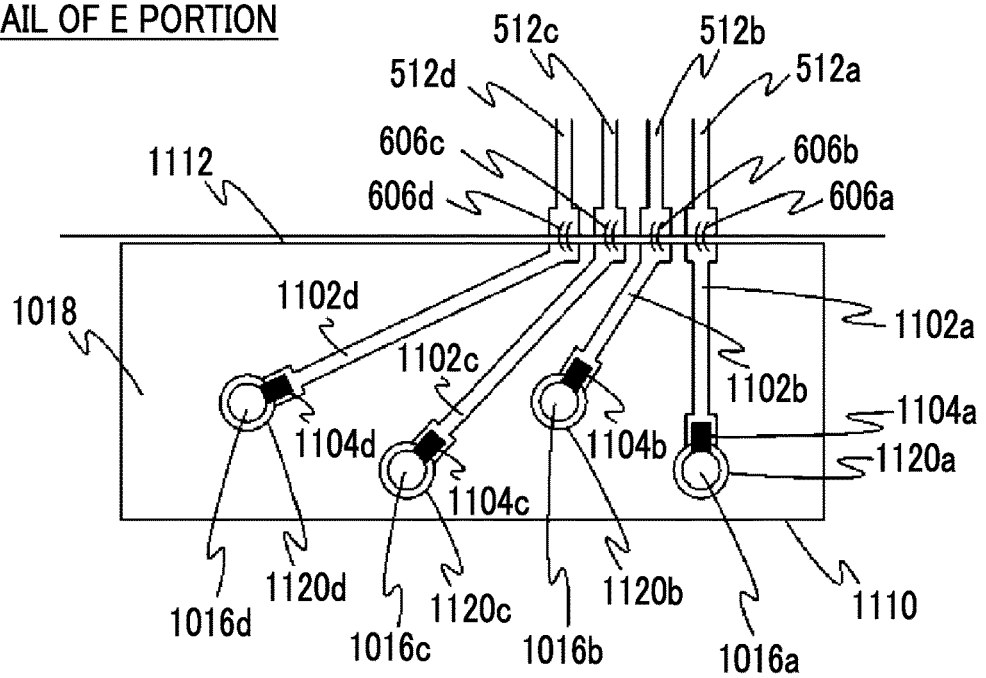
FIG. 11 is a partial detail view of an E portion of the optical modulator illustrated in FIG. 10.

FIG. 11 is a partial detail view of an E portion in the optical modulator 1000 illustrated in FIG. 10. The relay substrate 1018 has the same constitution as the relay substrate 518; however, instead of the conductor patterns 602a, 602b, 602c, 602d, includes conductor patterns 1102a, 1102b, 1102c, and 1102d that are disposed in a different manner from the above-described conductor patterns. The conductor patterns 1102a, 1102b, 1102c, and 1102d are linear patterns having the same width and are respectively electrically connected to the lead pins 1016a, 1016b, 1016c, and 1016d inserted through holes (through-holes) 1120a, 1120b, 1120c, and 1120d provided in the relay substrate 818 with solders 1104a, 1104b, 1104c, and 1104d.

In addition, the conductor patterns 1102a, 1102b, 1102c, and 1102d are respectively electrically connected to the RF electrodes 512a, 512b, 512c, and 512d of the optical modulation element 502 by, for example, the metal wires 606a, 606b, 606c, and 606d at the side of the relay substrate 1018 on the upper side of the drawing (a modulator-side edge 1112) in FIG. 11.

Particularly, in the present embodiment, since the lead pins 1016a, 1016b, 1016c, and 1016d are disposed at intervals that are wider than the disposition intervals between the RF electrodes 512a, 512b, 512c, and 512d, the conductor patterns 1102a, 1102b, 1102c, and 1102d extend from a lead pin-side edge 1110 to the modulator-side edge 1112 at slopes that are different from one another, and the lead pins 1016a, 1016b, 1016c, and 1016d are disposed in a zigzag shape. Therefore, the conductor patterns 1102a, 1102b, 1102c, and 1102d have physical lengths that are different from one another and thus have electrical lengths that are different from one another. Therefore, in the present embodiment, it is possible to prevent the resonance transition of high frequency power between the conductor patterns by making the resonant frequencies of the respective conductor patterns 1102a, 1102b, 1102c, and 1102d different from one another.

Fifth Embodiment

Next, a fifth embodiment of the present invention will be described. The present embodiment is an optical transmission apparatus embedded with any one of the optical modulators 100, 500, 800, and 1000 (including the optical modulators including the relay substrates according to the modification examples illustrated in FIGS. 3, 4, and 7) illustrated in FIGS. 1A, 5, 8, and 10 according to the first to fourth embodiments.

Figure 12:
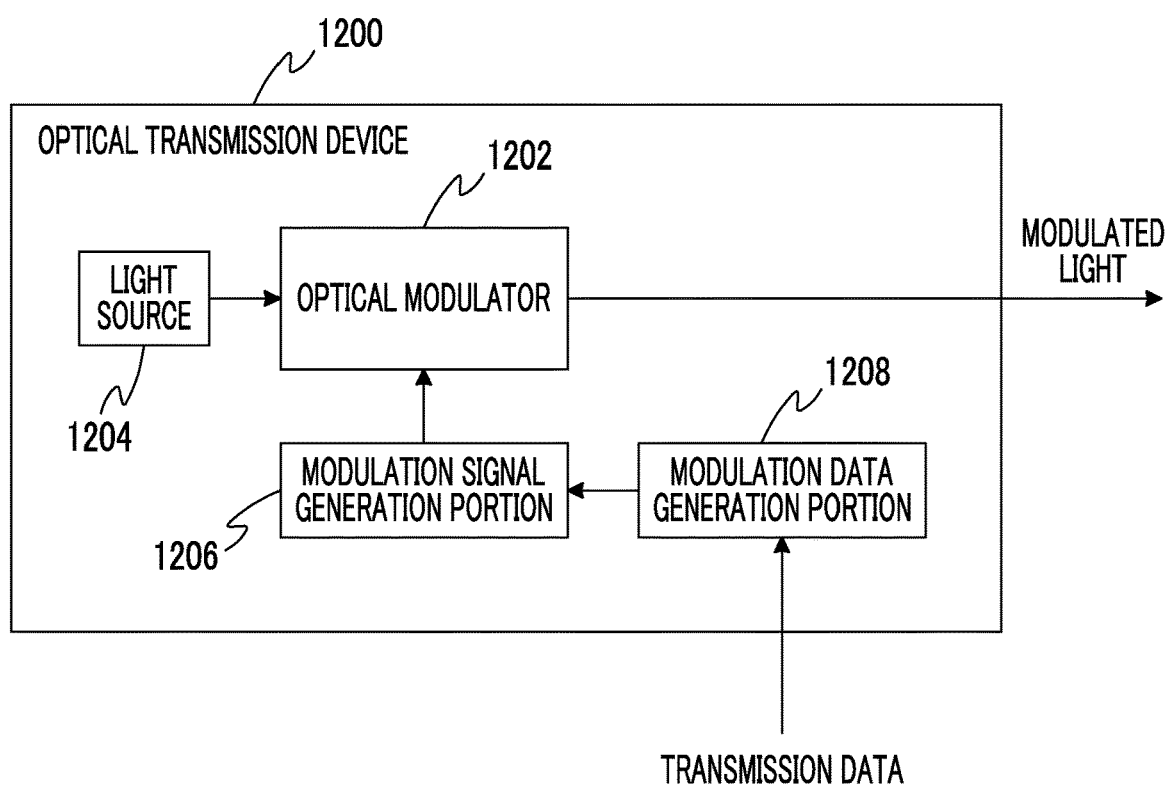
FIG. 12 is a view illustrating a constitution of an optical transmission apparatus according to a fifth embodiment of the present invention.
Figure 13A:
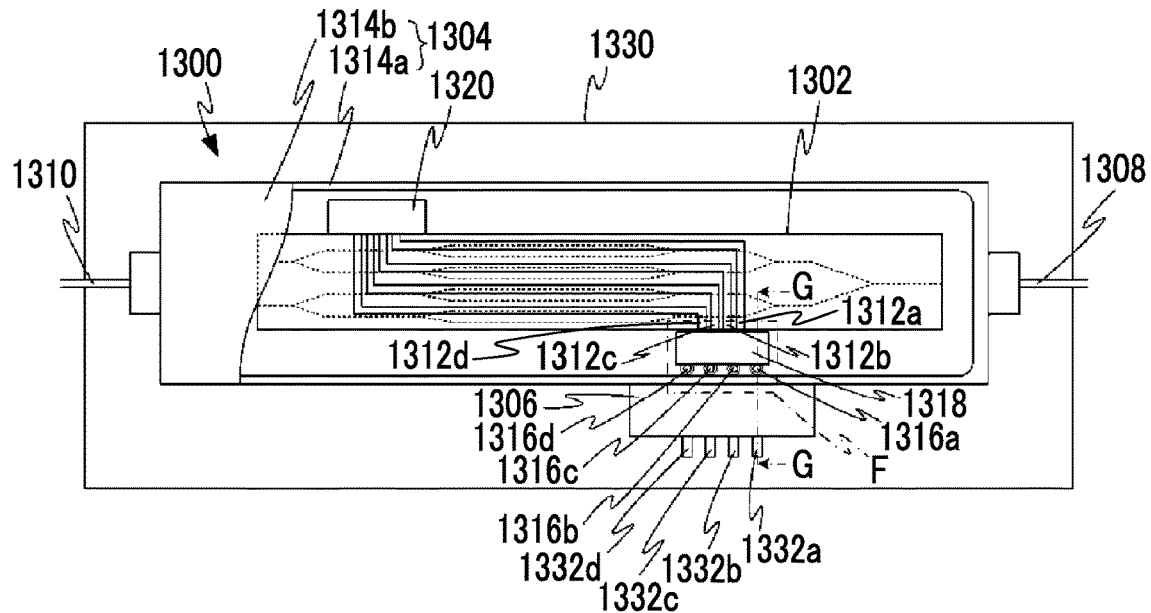
FIG. 13A is a plan view of an optical modulator of the related art illustrating a constitution of the optical modulator.
Figure 13B:
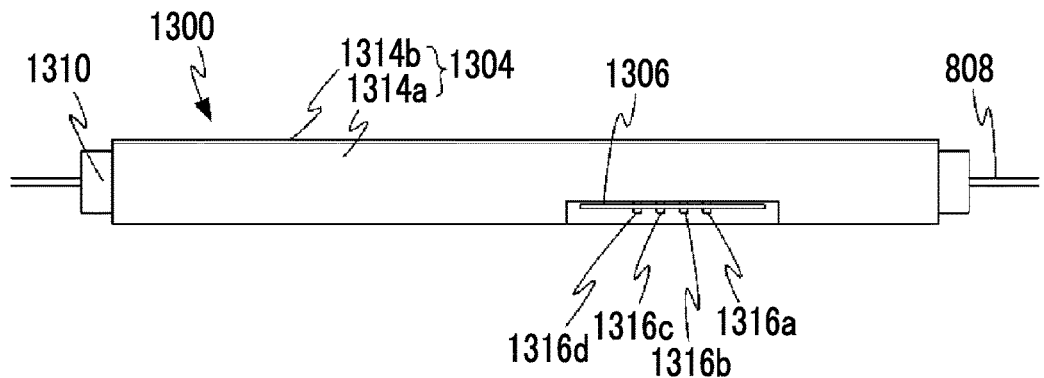
FIG. 13B is a side view of the optical modulator of the related art.
Figure 13C:
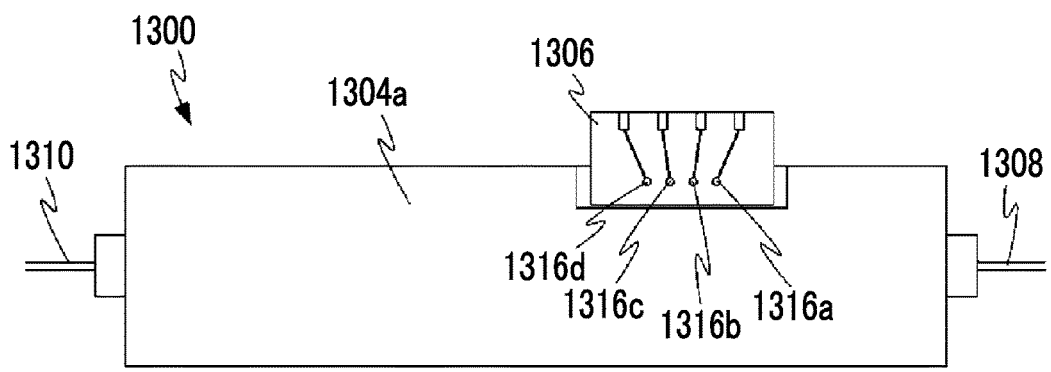
FIG. 13C is a bottom view of the optical modulator of the related art.
Figure 14A:
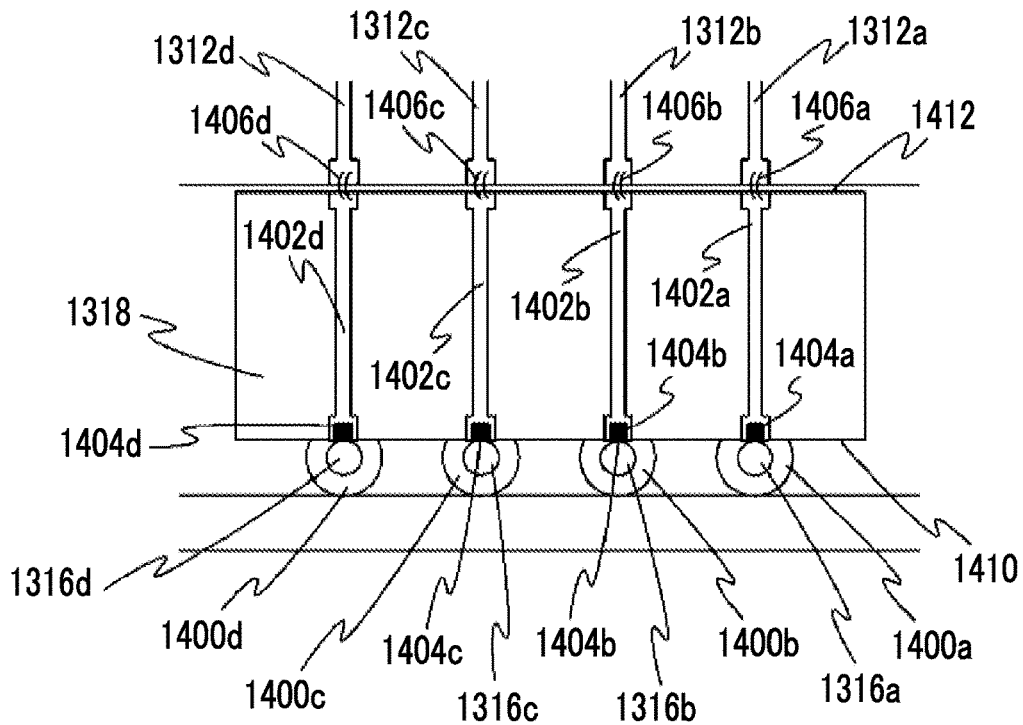
FIG. 14A is a partial detail view of an F portion of the optical modulator illustrated in FIG. 13A.
Figure 14B:
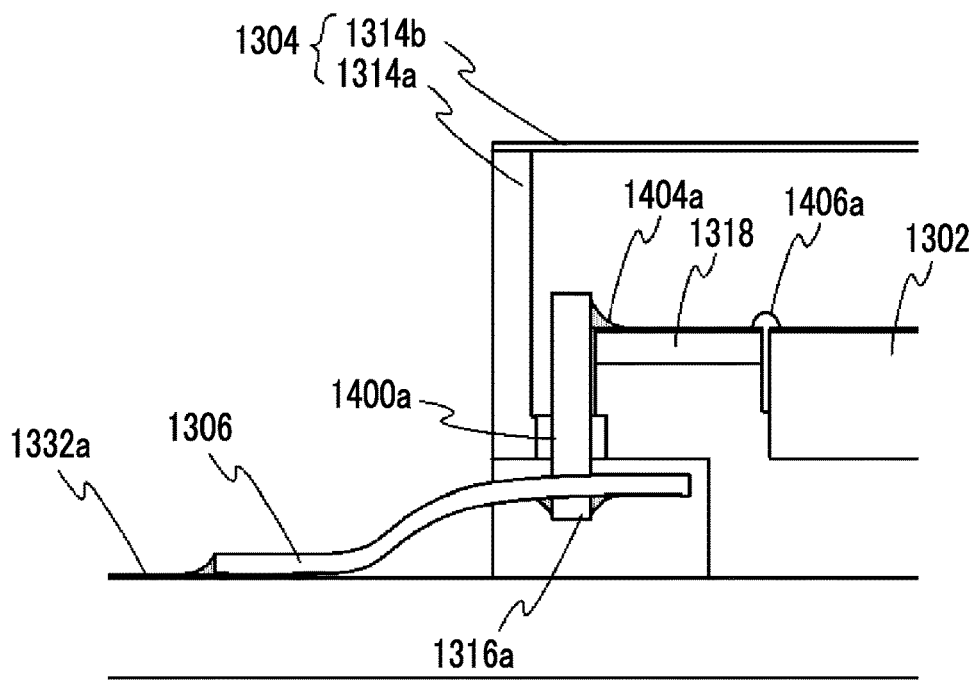
FIG. 14B is a cross-sectional view of the optical modulator in a direction of a VIIG-VIIG line in FIG. 13A.

FIG. 12 is a view illustrating the constitution of the optical transmission apparatus according to the present embodiment. The present optical transmission apparatus 1200 has an optical modulator 1202, a light source 1204 for making light incident on the optical modulator 1202, a modulation signal generation portion 1206, and a modulation data generation portion 1208.

As the optical modulator 1202, it is possible to use any one optical modulator of the optical modulators 100, 500, 800, and 1000 (including the optical modulators including the relay substrates according to the modification examples illustrated in FIGS. 3, 4, and 7) illustrated in FIGS. 1A, 5, 8, and 10. However, in the following description, in order to avoid redundant description and facilitate understanding, the optical modulator 100 will be used as the optical modulator 1202.

The modulation data generation portion 1208 receives transmission data that are supplied from the outside, generates modulation data for transmitting the transmission data (for example, data obtained by converting or processing transmission data to a predetermined data format), and outputs the generated modulation data to the modulation signal generation portion 1206.

The modulation signal generation portion 1206 is an electronic circuit (drive circuit) that outputs electrical signals for causing modulation operation in the optical modulator 1202, generates modulation signals which are high frequency signals for causing optical modulation operations according to the modulation data in the optical modulator 1202 on the basis of the modulation data output by the modulation data generation portion 1208, and inputs the modulation signals to the optical modulator 1202. The modulation signals are made up of four RF signals corresponding to the four RF electrodes 112a, 112b, 112c, and 112d of the optical modulation element 102 in the optical modulator 100 that is the optical modulator 1202.

The four RF signals are input to the lead pins 116a, 116b, 116c, and 116d through the FPC 106 in the optical modulator 100 that is the optical modulator 1202 and are respectively applied to the RF electrodes 112a, 112b, 112c, and 112d via the relay substrate 118.

Therefore, light output from the light source 1204 is modulated by the optical modulator 1202, turns into modulated light, and is output from the optical transmission apparatus 1200.

Particularly, in the present optical transmission apparatus 1200, since the optical modulator 100 having the above-described constitution (or any one optical modulator of the optical modulators 100, 500, 800, and 1000 (including the optical modulators including the relay substrates according to the modification examples illustrated in FIGS. 3, 4, and 7) illustrated in FIGS. 5, 8, and 10) is used as the optical modulator 1202, it is possible to ensure stable and favorable optical modulation characteristics by preventing the resonance transition of high frequencies between the conductor patterns (202a and the like) provided on the relay substrate (118 and the like) used in the optical modulator 1202 and thus realize stable and favorable transmission characteristics.

Meanwhile, in the respective embodiments described above, the optical modulators including the optical modulation element which has the substrate made of LN and four RF electrodes have been described, but the present invention is not limited thereto and can also be applied in the same manner to optical modulators having more or less (a plurality of) RF electrodes and optical modulators in which materials other than LN are used for substrates.

Hitherto, as described above, the optical modulators according to the first to fourth embodiment and the relevant modification examples include the optical modulation element (102 or the like) including the plurality of signal electrodes (112a and the like), the plurality of lead pins (116a and the like) for inputting high frequency signals, and the relay substrate (118 or the like) on which the conductor patterns (202a and the like) that electrically connect the lead pins and the signal electrodes are formed, and at least one of the conductor patterns is constituted so that at least one resonant frequency of the at least one of the conductor patterns is different from at least one resonant frequency of at least one of the other conductor patterns. Therefore, in the optical modulator according to the present invention, it is possible to reduce the influence of resonance transition between the conductor patterns and prevent the deterioration of optical modulation characteristics.

Meanwhile, the relationship between the at least one resonant frequency of the at least one of the conductor patterns and the at least one resonant frequency of at least one of the other conductor patterns is preferably not a relationship between a fundamental wave and a harmonic wave, that is, a relationship in which any one resonant frequency is not an integral multiple of the other resonant frequency. Therefore, for example, when at least one resonant frequency of at least one of the conductor patterns is set as a fundamental wave, it is also possible to effectively prevent resonance transition that may be caused between a different conductor pattern having a resonant frequency that corresponds to a harmonic wave of the fundamental wave and the at least one of the conductor patterns.

The above-described constitution can be realized by, for example, setting the electrical length of a portion corresponding to at least one resonant frequency in at least one of the conductor patterns and the electrical length of a portion corresponding to at least one resonant frequency in at least one of the other conductor patterns to be not in an integral multiple relationship, that is, one electrical length being not an integral multiple of the other electrical length. Particularly, in a case in which the shortest electrical length among the electrical lengths that are formed by the conductor patterns provided on the relay substrate (that is, the electrical lengths that contribute to resonance) is represented by Lr, when other electrical lengths are constituted to be shorter than 2Lr, resonance transition between the above-described fundamental wave and harmonic wave is prevented, and the size of the optical modulator can be reduced by reducing the size of the relay substrate.

What is claimed is:

1. An optical modulator comprising:
an optical modulation element including a plurality of signal electrodes;
a plurality of lead pins for inputting microwave signals with any frequency of 10 Gb/s or higher; and
a relay substrate on which a plurality of conductor patterns are formed, the conductor patterns electrically connect the lead pins and the signal electrodes,
wherein each of the conductor patterns formed on the relay substrate is a signal conductor and forms, a microwave signal input side connection portion on a lead pin side of the relay substrate and is electrically connected to one of the lead pins disposed in a vicinity of the lead pin side, and a microwave signal output side connection portion on a modulator side of the relay substrate and is electrically connected to one of the signal electrodes disposed in a vicinity of the modulator side of the relay substrate,
electric components are disposed on the relay substrate, and the electric components are connected to a respective conductor patterns,
each of the conductor patterns and respective electric component define a first electrical length between the microwave signal input side connection portion and the electric component and a second electrical length between the electric component and the microwave signal output side connection portion, and the first and second lengths of at least one of the conductor patterns is different from the first and second lengths of at least one of the other conductor patterns.

2. The optical modulator according to claim 1, wherein the at least one of the conductor patterns includes portions that are divided by one or a plurality of curved portions and a resonant frequency in at least one of the divided portions is different from a resonance frequency of at least one of the other conductor patterns.

3. The optical modulator according to claim 1, wherein the relay substrate has at least one through-hole, and at least one of the other lead pins is inserted through the through-hole and electrically connected to a one of the other conductor patterns.

4. The optical modulator according to claim 1,
wherein the relay substrate has a plurality of through-holes through which the lead pins are inserted respectively,
the lead pins are respectively inserted through the through-holes and electrically connected to the respective conductor patterns,
the signal electrodes of the optical modulation element are electrically connected to the respective conductor patterns at the modulator side of the relay substrate, and
the electrical length of the conductor pattern from at least one of the through-holes at the lead pin side is different from the electrical length of the conductor pattern from the other through-holes to the lead pin side.

5. The optical modulator according to claim 2, wherein, regarding the electrical length of a portion of the at least one of the conductor pattern corresponding to the at least one of the resonant frequencies of the at least one of the conductor patterns and the electrical length of a portion of the at least one of the other conductor pattern corresponding to the at least one of the resonant frequencies of the at least one of the other conductor patterns, one electrical length is not an integral multiple of the other electrical length or regarding the at least one of the resonant frequencies of the at least one of the conductor patterns and the at least one of the resonant frequencies of the at least one of the other conductor patterns, one resonant frequency is not an integral multiple of the other resonant frequency.

6. An optical transmission apparatus comprising: the optical modulator according to claim 1; and an electronic circuit that outputs electrical signals for causing the optical modulator to perform modulation operation.

7. The optical modulator according to claim 1, wherein the electrical components connected to conductor patterns are a high pass filter, a band pass filter, or a low pass filter.

8. An optical modulator comprising:
an optical modulation element including a plurality of signal electrodes;
a plurality of lead pins for inputting microwave signals with any frequency of 10 Gb/s or higher; and
a relay substrate on which a plurality of conductor patterns are formed, the conductor patterns electrically connect the lead pins and the signal electrodes,
wherein each of the conductor patterns formed on the relay substrate is a signal conductor and forms, a microwave signal input side connection portion on a lead pin side of the relay substrate and is electrically connected to one of the lead pins disposed in a vicinity of the lead pin side, and a microwave signal output side connection portion on a modulator side of the relay substrate and is electrically connected to one of the signal electrodes disposed in a vicinity of the modulator side of the relay substrate,
electric components are disposed on the relay substrate, and the electric components are connected to a respective conductor patterns,
each of the conductor patterns and respective electric component define a first electrical width between the microwave signal input side connection portion and the electric component and a second electrical width between the electric component and the microwave signal output side connection portion, and the first and second widths of at least one of the conductor patterns is different from the first and second widths of at least one of the other conductor pattern.

9. The optical modulator according to claim 8, wherein the relay substrate has at least one through-hole, and at least one of the lead pins is inserted through the through-hole and electrically connected to a one of the conductor patterns.

10. The optical modulator according to claim 8, wherein the relay substrate has a plurality of through-holes through which the lead pins are inserted respectively, the lead pins are respectively inserted through the through-holes and electrically connected to the respective conductor patterns, the signal electrodes of the optical modulation element are electrically connected to the respective conductor patterns at the modulator side of the relay substrate, and the electrical length of the conductor pattern from at least one of the through-holes at the lead pin side is different from the electrical length of the conductor pattern from the other through-holes to the lead pin side.

11. An optical transmission apparatus comprising: the optical modulator according to claim 8; and an electronic circuit that outputs electrical signals for causing the optical modulator to perform modulation operation.

12. The optical modulator according to claim 8, wherein the electric components connected to conductor patterns are a high pass filter, a band pass filter, or a low pass filter.

* * * * *